(12) United States Patent
Wu et al.

(10) Patent No.: US 8,582,492 B2
(45) Date of Patent: Nov. 12, 2013

(54) METHODS AND APPARATUS SUPPORTING ADAPTIVE DECENTRALIZED TRAFFIC SCHEDULING INCLUDING A DYNAMIC RECEIVER YIELDING THRESHOLD

(75) Inventors: Xinzhou Wu, Monmouth Junction, NJ (US); Junyi Li, Chester, NJ (US); Sanjay Shakkottai, Austin, TX (US); Rajiv Laroia, Far Hills, NJ (US); Saurabh Tavildar, Jersey City, NJ (US); Thomas Richardson, South Orange, NJ (US); Jay Kumar Sundararajan, Cambridge, MA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 12/268,186

(22) Filed: Nov. 10, 2008

(65) Prior Publication Data

US 2010/0118761 A1   May 13, 2010

(51) Int. Cl.
   *H04B 7/14*   (2006.01)
(52) U.S. Cl.
   USPC ..... 370/315; 455/500; 455/435.3; 455/277.2; 455/512; 455/135
(58) Field of Classification Search
   None
   See application file for complete search history.

(56) References Cited

U.S. PATENT DOCUMENTS

| | | | |
|---|---|---|---|
| 6,515,975 B1 * | 2/2003 | Chheda et al. | 370/332 |
| 6,954,435 B2 * | 10/2005 | Billhartz et al. | 370/252 |
| 7,035,662 B2 | 4/2006 | Lee | |
| 7,539,507 B2 | 5/2009 | Grob et al. | |
| 7,548,758 B2 | 6/2009 | Periyalwar et al. | |
| 8,072,917 B2 | 12/2011 | Wu et al. | |
| 8,081,592 B2 | 12/2011 | Sampath et al. | |
| 2003/0181204 A1 * | 9/2003 | Benveniste | 455/422.1 |
| 2004/0170150 A1 | 9/2004 | Guo et al. | |
| 2004/0180677 A1 * | 9/2004 | Harris et al. | 455/466 |
| 2004/0203450 A1 | 10/2004 | Cho | |

(Continued)

FOREIGN PATENT DOCUMENTS

| | | |
|---|---|---|
| CN | 1679284 A | 10/2005 |
| CN | 1881834 A | 12/2006 |

(Continued)

OTHER PUBLICATIONS

International Search Report & Written Opinion—PCT/US2009/062890, International Search Authority—European Patent Office—Mar. 4, 2010.

(Continued)

*Primary Examiner* — Yuwen Pan
*Assistant Examiner* — Fanghwa Wang
(74) *Attorney, Agent, or Firm* — Joseph B. Agusta

(57) ABSTRACT

Methods and apparatus relating to scheduling of air link resources, e.g., traffic segments, in a wireless communications system are described. Various described methods and apparatus are well suited to wireless peer to peer networks in which traffic scheduling is decentralized, e.g. an ad hoc peer to peer network. An individual wireless terminal corresponding to a peer to peer connection which desires to communicate traffic signals makes a receiver yielding decision. The receiver yielding decision, in some embodiments, includes comparing a link quality estimate corresponding to its own link, to a dynamically generated receiver yielding threshold. The dynamically generated receiver yielding threshold is determined based on at least one of: quality of service information corresponding to its own link and historical link quality information corresponding to its own link.

37 Claims, 21 Drawing Sheets

(56) References Cited

U.S. PATENT DOCUMENTS

| | | |
|---|---|---|
| 2005/0135284 A1 | 6/2005 | Nanda et al. |
| 2005/0186982 A1 | 8/2005 | Chen et al. |
| 2006/0083161 A1 | 4/2006 | Laroia et al. |
| 2006/0168343 A1 | 7/2006 | Ma et al. |
| 2007/0019664 A1 | 1/2007 | Benveniste |
| 2007/0135139 A1* | 6/2007 | Avidor et al. .............. 455/456.5 |
| 2008/0039046 A1* | 2/2008 | Vilzmann et al. ............. 455/296 |
| 2008/0192724 A1 | 8/2008 | Kondo et al. |
| 2008/0318612 A1 | 12/2008 | Axnas et al. |
| 2009/0011778 A1 | 1/2009 | Jung et al. |
| 2009/0015478 A1 | 1/2009 | Li et al. |
| 2009/0016289 A1 | 1/2009 | Li et al. |
| 2009/0017858 A1 | 1/2009 | Kwon et al. |
| 2009/0019165 A1 | 1/2009 | Li et al. |
| 2009/0109850 A1 | 4/2009 | Li et al. |
| 2009/0111506 A1 | 4/2009 | Laroia et al. |
| 2009/0257351 A1 | 10/2009 | Hande et al. |
| 2009/0323665 A1 | 12/2009 | Li et al. |
| 2010/0118702 A1 | 5/2010 | Wu et al. |
| 2010/0210238 A1 | 8/2010 | Cho et al. |

FOREIGN PATENT DOCUMENTS

| | | |
|---|---|---|
| CN | 101091324 | 12/2007 |
| CN | 101146354 A | 3/2008 |
| CN | 101300879 | 11/2008 |
| EP | 1628446 A1 | 2/2006 |
| EP | 1855423 A1 | 11/2007 |
| EP | 1901451 A2 | 3/2008 |
| EP | 2120464 A1 | 11/2009 |
| EP | 2210379 | 7/2010 |
| JP | 2000041279 A | 2/2000 |
| JP | 2005303910 A | 10/2005 |
| JP | 2007142722 A | 6/2007 |
| JP | 2008022535 A | 1/2008 |
| KR | 20030091290 A | 12/2003 |
| KR | 20050004281 A | 1/2005 |
| TW | 200824474 A | 6/2008 |
| WO | WO2006002379 | 1/2006 |
| WO | WO2006016331 A1 | 2/2006 |
| WO | 2006073223 A1 | 7/2006 |
| WO | 2006132328 A1 | 12/2006 |
| WO | 2008034023 | 3/2008 |
| WO | 2008034029 | 3/2008 |
| WO | 2008034038 A1 | 3/2008 |
| WO | WO2008081865 | 7/2008 |
| WO | WO2009009458 | 1/2009 |
| WO | WO2009009547 | 1/2009 |
| WO | 20090058151 | 5/2009 |
| WO | WO2009059154 | 5/2009 |
| WO | WO2009129268 | 10/2009 |

OTHER PUBLICATIONS

Hande, et al., "Methods and Apparatus Related to Controlling Traffic in a Wireless Communications System Using Shared Air Link Traffic Resources", Apr. 15, 2008, pp. 1-36.

Hande, et al., "Notes on Load-Spillage based Link Scheduling Mechanism", Apr. 15, 2008, pp. 1-2.

Taiwan Search Report—TW098137476—TIPO—Mar. 20, 2013.

* cited by examiner

METHODS AND APPARATUS SUPPORTING ADAPTIVE DECENTRALIZED TRAFFIC SCHEDULING INCLUDING A DYNAMIC RECEIVER YIELDING THRESHOLD

FIELD

Various embodiments relate to wireless communications, and more particularly, to methods and apparatus related to peer to peer communications.

BACKGROUND

In a wireless communications system lacking centralized control, the scheduling of traffic segments can be a challenging task. Wireless terminals corresponding to different connections may desire to use the same traffic segment concurrently. Depending on conditions and/or location, at times it may be acceptable for two connections to use the same traffic segment, while at other times it may not be tolerable. When making wireless terminal transmission determinations, situational awareness, e.g., situational awareness of the needs and/or requirements of other wireless terminals and/or other connections in its vicinity, can be beneficial. Rigid approaches to transmission determination, although easy to implement, may lead to traffic air link resource usage inefficiencies. Based on the above discussion it should be appreciated there is a need for methods and apparatus that are adaptive and allow for some flexibility relative to whether or not traffic data is to be transmitted.

SUMMARY

Methods and apparatus relating to scheduling of air link resources, e.g., traffic segments, in a wireless communications system are described. Various described methods and apparatus are well suited to wireless peer to peer networks in which traffic scheduling is decentralized, e.g. an ad hoc peer to peer network. In some embodiments individual wireless terminals corresponding to a peer to peer connection which desire to communicate traffic signals make transmitter yielding and/or receiver yielding decisions on a traffic slot by traffic slot basis.

A first pair of wireless terminals, e.g., second and third wireless terminals, can have a first peer to peer connection, and a second pair of wireless terminals, e.g., fourth and first wireless terminals, can have a second peer to peer connection. For purposes of understanding at least some embodiments, consider that there is a notion of priority associated with the connections for the traffic slot, and that the first connection has a higher priority than the second connection. Further consider that both connections desire to communicate traffic in the same traffic slot using the same air link resource, e.g. traffic segment. Wireless terminals of lower priority connections make decisions whether or not to yield to higher priority connections.

An interference management approach used in some, but not necessarily all embodiments, will now be described. Thresholds used for receiver yielding decisions are dynamically calculated, e.g., individually on a slot by slot basis for each wireless terminal making a receiver yielding decision. In some such embodiments a dynamic yielding threshold is determined, e.g. on a per slot basis, based on at least one of historic link quality information corresponding to its own link and current quality of service information corresponding to its own link.

An exemplary method of operating a first wireless terminal in a system including a first wireless communications link from a second wireless terminal to a third wireless terminal, said first communications link having a higher priority than a second communications link from a fourth wireless terminal to said first wireless terminal, in accordance with some embodiments, comprises: receiving a signal from the second wireless terminal; receiving a transmission request from the fourth wireless terminal; estimating the quality of the second communications link from the signal received from the second wireless terminal and the transmission request received from the fourth wireless terminal; and dynamically generating a yielding threshold based on at least one of: i) historic link quality information corresponding to the second link; and ii) quality of service information corresponding to the second communications link.

An exemplary first wireless terminal in a system including a first wireless communications link from a second wireless terminal to a third wireless terminal, said first communications link having a higher priority than a second communications link from a fourth wireless terminal to said first wireless terminal, in accordance with some embodiments, comprises: at least one processor configured to: receive a signal from the second wireless terminal; receive a transmission request from the fourth wireless terminal; estimate the quality of the second communications link from the signal received from the second wireless terminal and the transmission request received from the fourth wireless terminal; and dynamically generate a yielding threshold based on at least one of: i) historic link quality information corresponding to the second link; or ii) quality of service information corresponding to the second communications link. The exemplary first wireless terminal further comprises a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
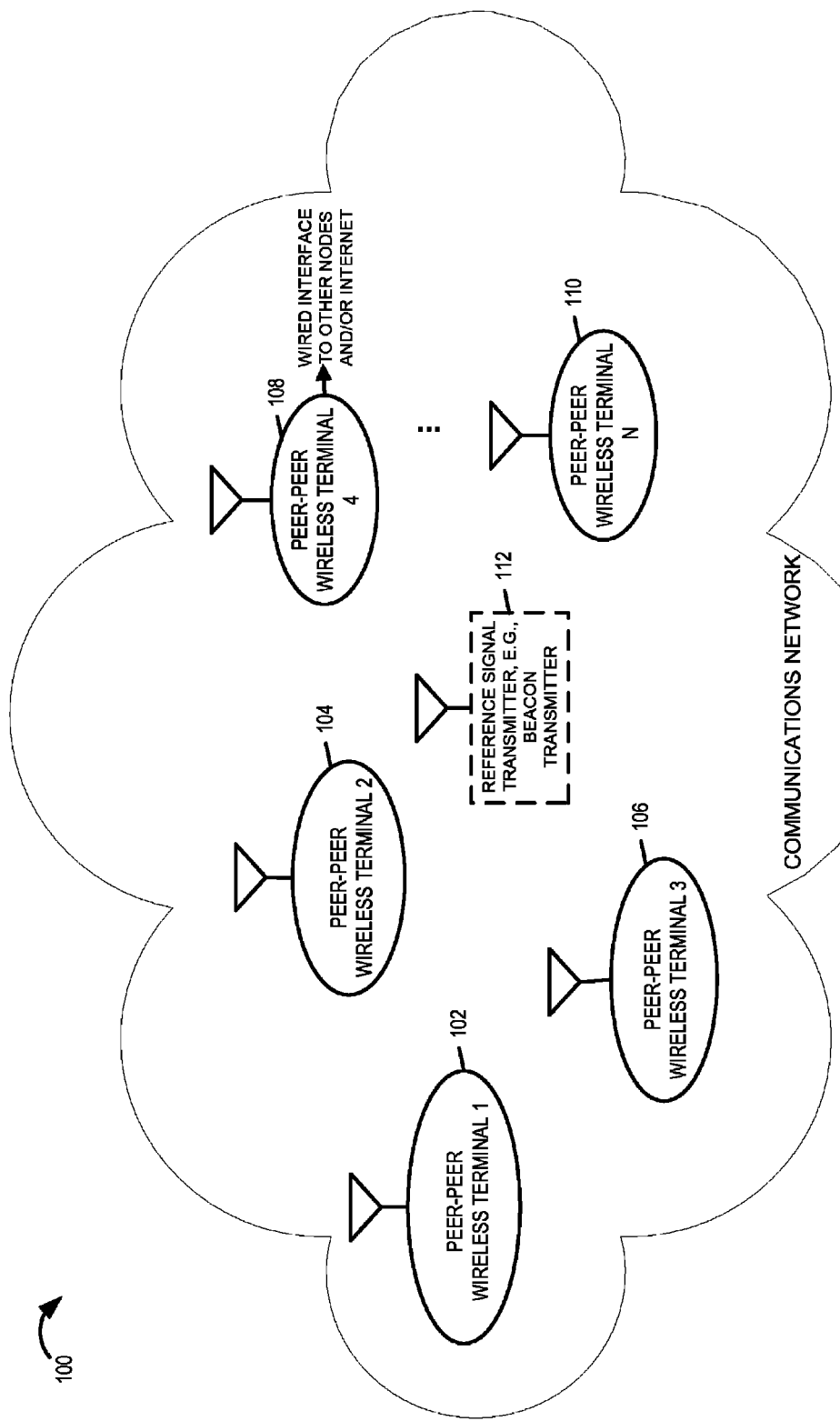
FIG. 1 is a drawing of an exemplary peer to peer network, e.g., an ad-hoc communications network, in accordance with an exemplary embodiment.

FIG. 1 is a drawing of an exemplary peer to peer network 100, e.g., an ad-hoc communications network, in accordance with an exemplary embodiment. The exemplary network 100 supports peer to peer traffic signaling by communication devices, e.g., mobile and/or stationary wireless terminals. The exemplary network 100 supports decentralized scheduling of traffic air link resources, e.g., traffic segments, on a slot by slot basis. Exemplary peer to peer network 100 includes a plurality of wireless devices (peer to peer communications device 1 102, peer to peer communications device 2 104, peer to peer communications device 3 106, peer to peer communications device 4 108, ..., peer to peer communications device N 110) supporting peer to peer traffic signaling. In some embodiments, the network 100 includes a reference signal transmitter 116, e.g., a beacon transmitter. The wireless devices (102, 104, 106, 108, ..., 110) in the communications network 100 can establish connections with one another, e.g., peer to peer connections, generate and transmit traffic transmission request signals, receive and process traffic transmission request signals, make receiver yielding decisions, generate and transmit traffic transmission request response signals, receive and process traffic transmission request response signals, make transmitter yielding decisions, receive peer to peer traffic signals, and transmit peer to peer traffic signals. In some embodiments, the power level of a transmission request response signal is a function of quality of service information. In various embodiments, dynamic receiver yielding thresholds are calculated and used to make receiver yielding decisions. In some embodiments, dynamic transmitter yielding thresholds are calculated and used to make transmitter yielding decisions. There is a recurring timing structure used in the network 100. In some embodiments a reference signal, e.g., an OFDM beacon signal from reference signal transmitter 116, is used by a wireless device to synchronize with respect to the timing structure. Alternatively, a signal used to synchronize with the timing structure may be sourced from another device, e.g., a GPS transmitter, a base station or another peer to peer device. The timing structure used in the exemplary communications network 1000 includes a plurality of individual traffic slots.

Figure 2:
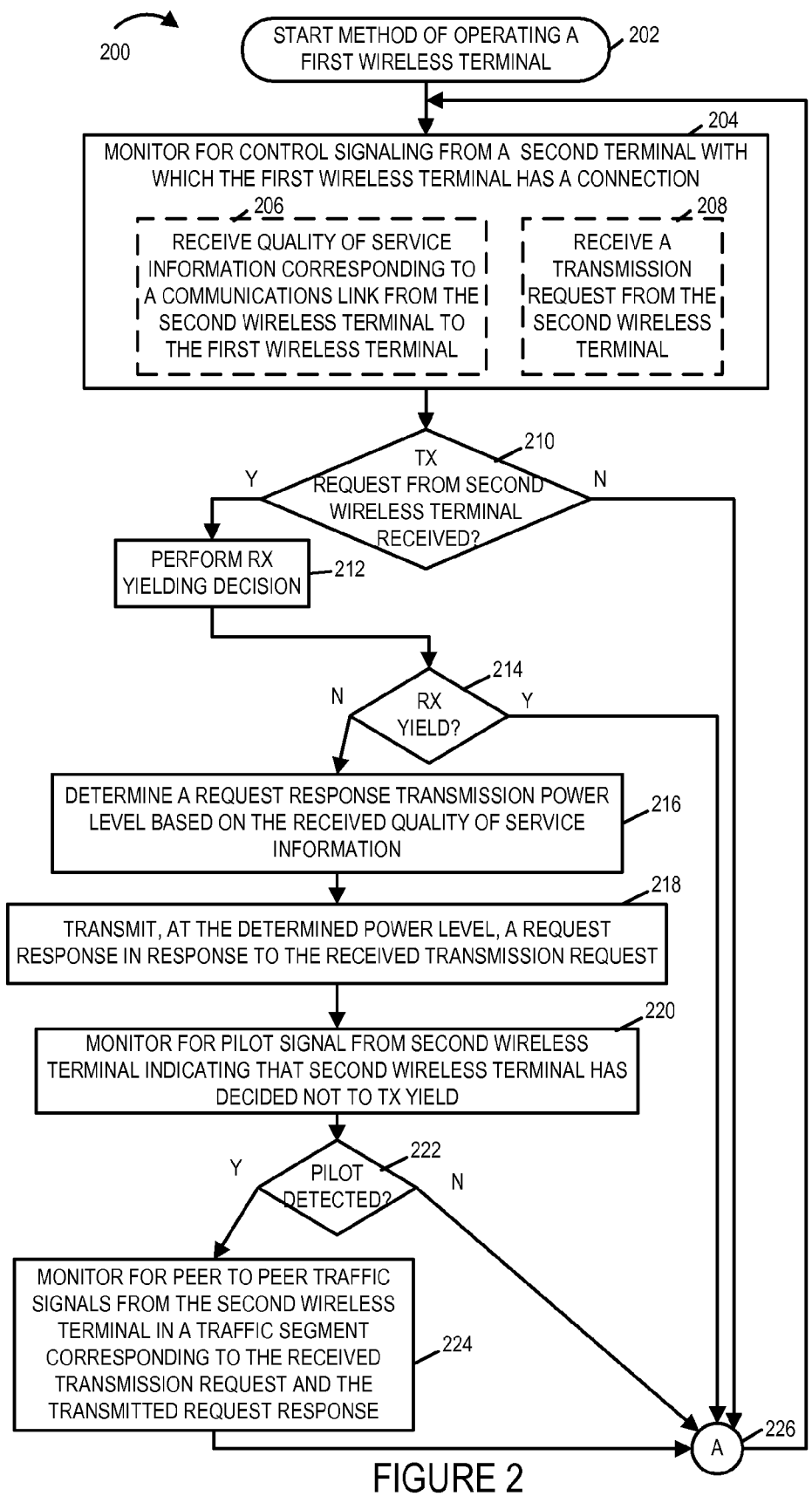
FIG. 2 is a flowchart of an exemplary method of operating a first wireless terminal in a peer to peer communications system.

FIG. 2 is a flowchart 200 of an exemplary method of operating a first wireless terminal in a peer to peer communications system. Operation starts in step 202 where the first wireless terminal is powered on, initialized and establishes a connection with a second wireless terminal. The second and first wireless terminals may be, and sometimes are, mobile devices.

Operation proceeds from start step 202 to step 204. In step 204, the first wireless terminal monitors for control signaling from a second wireless terminal with which the first wireless terminal has a connection. Step 204 may, and sometimes does, include sub-steps 206 and 208. In sub-step 206 the first wireless terminal receives quality of service information corresponding to a communications link from the second wireless terminal to the first wireless terminal. In some embodiments, the quality of service information is a function of the type of data to be transmitted by the second wireless terminal to the first wireless terminal in a traffic slot corresponding to the transmission request, e.g., in a traffic segment subsequent to the request which corresponds to the request. In some embodiments, the quality of service information is a function of the amount of data waiting to be transmitted by the second wireless terminal to the first wireless terminal. In sub-step 208 the first wireless terminal receives a transmission request from the second wireless terminal. In some embodiments, the quality of service information and the transmission request are received in separate signals. In some other embodiments, the quality of service information and the transmission request are received in a single signal. Operation proceeds from step 204 to step 210.

In step 210 the first wireless terminal determines whether or not a transmission request from the second wireless terminal was received during the monitoring of step 204. If a transmission request from the second wireless terminal was received, then operation proceeds from step 210 to step 212; otherwise, operation proceeds from step 210 to connecting node A 226.

Returning to step 212, in step 212 the first wireless terminal performs a receiver (RX) yielding decision. A decision not to yield is a decision signifying that it is ok to proceed with intended traffic transmission from the perspective of the first wireless terminal. A decision to RX yield is a decision signifying that the second wireless terminal should not proceed with its intended traffic transmission to the first wireless terminal, from the perspective of the first wireless terminal. Operation proceeds from step 212 to step 214.

If the decision of step 212 is to RX yield then operation proceeds from step 214 to connecting node A 226; otherwise, operation proceeds from step 214 to step 216. In step 216 the first wireless terminal determines a request response transmission power level based on the received quality of service information. In some embodiments, determining a request response transmission power includes increasing the request response transmission power from a previously determined request response transmission power level when the received quality of service information indicates an increase in a quality of service corresponding to the communications link from the second wireless terminal to the first wireless terminal. In some embodiments, determining a request response transmission power includes decreasing the request response transmission power from a previously determined request response transmission power level when the received quality of service information indicates a decrease in a quality of service corresponding to the communications link from the second wireless terminal to the first wireless terminal. In various embodiments, determining a request response transmission power level includes: i) determining a minimum request response transmission power level based on the received power of the transmission request; and ii) decreasing the request response transmission power level from a previously determined request response transmission power level when: the previously transmitted request response transmission power level exceeds the determined minimum request response transmission power level and the quality of service information indicates a decrease in a quality of service corresponding to the communications link from the second wireless terminal to the first wireless terminal.

Operation proceeds from step 216 to step 218 in which the first wireless terminal transmits, at the determined power level, a request response in response to the received transmission request of sub-step 208. Then in step 220 the first wireless terminal monitors for a pilot signal from the second wireless terminal indicating that the second wireless terminal has decided not to transmit yield. In this exemplary embodiment, if the second wireless terminal decides to transmit yield then the second wireless terminal does not transmit a pilot signal. Operation proceeds from step 220 to step 222.

If a pilot from the second wireless terminal was detected in the monitoring of step 220, then operation proceeds from step 222 to step 224; otherwise, operation proceeds to connecting node A 226. Returning to step 224, in step 224, the first wireless terminal monitors for peer to peer traffic signals from the second wireless terminal in a traffic segment corresponding to the received transmission request and the transmitted request response. The monitoring of step 224 may, and sometimes does, include receiving and recovering of peer to peer traffic signals from the from the second wireless terminal. Operation proceeds from step 224 to connecting node A 226.

Operation proceeds from connecting node A 226 to the input of step 204, where the first wireless terminal monitors for control signaling from the second wireless terminal, e.g., corresponding to another traffic transmission slot.

Figure 3:
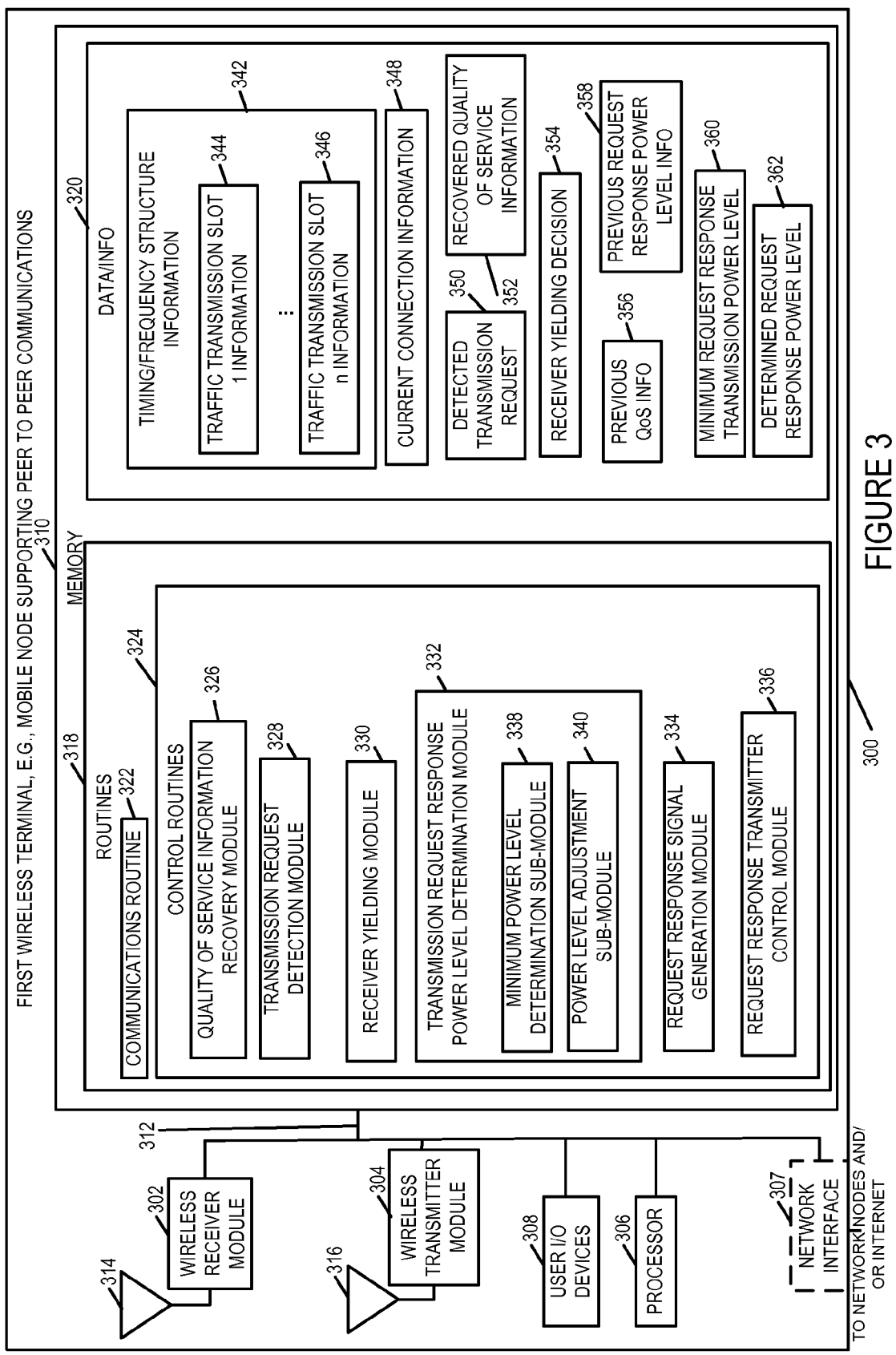
FIG. 3 is a drawing of an exemplary first wireless terminal, e.g., a mobile node supporting peer to peer communications in accordance with an exemplary embodiment.

FIG. 3 is a drawing of an exemplary first wireless terminal 300, e.g., a mobile node supporting peer to peer communications in accordance with an exemplary embodiment. Exemplary first wireless terminal 300 includes a wireless receiver module 302, a wireless transmitter module 304, a processor 306, user I/O devices 308 and a memory 310 coupled together via a bus 312 over which the various elements may interchange data and information. In some embodiments, first wireless terminal 300 also includes network interface 307 which is also coupled to bus 312. Network interface 307, when implemented, allows first wireless terminal 300 to be coupled to network nodes and/or the Internet via a backhaul network.

Memory 310 includes routines 318 and data/information 320. The processor 306, e.g., a CPU, executes the routines 318 and uses the data/information 320 in memory 310 to control the operation of the first wireless terminal 300 and implement methods, e.g., the method of flowchart 200 of FIG. 2.

User I/O devices 308 include, e.g., microphone, keyboard keypad, mouse, switches, camera, speaker, display, etc. User I/O device 308 allow an operator of first wireless terminal 300 to input data/information, access output data/information and control at least some functions of the first wireless terminal 300.

Wireless receiver module 302, e.g., an OFDM and/or CDMA receiver, is coupled to receive antenna 314 via which the first wireless terminal 300 receives signals from other communications devices. Received signals include connection establishment signals, connection maintenance signals, transmission request signals and traffic signals.

Wireless transmitter module 304, e.g., an OFDM and/or CDMA transmitter is coupled to transmit antenna 316 via which the first wireless terminal 300 transmits signals to other communications devices. Transmitted signals include connection establishment signals, connection maintenance signals, and traffic transmission request response signals. In some embodiments the same antenna is used for receiver and transmitter.

Routines 318 include a communications routine 322 and control routines 324. The communications routine 322 implements the various protocols used by the first wireless terminal 300. Control routines 324 include a quality of service information recovery module 326, a transmission request detection module 328, a receiver yielding module 330, a transmission request response power level determination module 332, a request response signal generation module 334 and a request response transmitter control module 336. Transmission request response power level determination module in some embodiments includes one or more of minimum power level determination sub-module 338 and power level adjustment sub-module 340.

Data/information 320 includes timing/frequency structure information 342, current connection information 348, detected transmission request 350, recovered quality of service information 352 corresponding to detected transmission request 350, receiver yielding decision 354, stored previous quality of service information 356, stored previous request response power level information 358, minimum request response transmission power level 360 and determined request response power level 362. Timing/frequency structure information 342 includes information corresponding to a plurality of traffic transmission slots in a recurring peer to peer timing structure (traffic transmission slot 1 information 344, . . . , traffic transmission slot n information 346). Traffic transmission slot 1 information includes information identifying air link resources used for conveying transmission request signals, air link resources used for conveying request response signals, and air link resources used for conveying traffic signals, e.g., a traffic segment. Current connection information 348 includes information identifying a currently held connection of first wireless terminal 300, e.g., a connection identifier associated with a connection between a second wireless terminal and the first wireless terminal 300. In some embodiments, a particular air link resource in a transmission request block and a particular air link resource in a transmission request response block are associated with a connection identifier, e.g., in accordance with the timing/frequency structure information. A priority level associated with a connection identifier, in some embodiments, may, and sometimes does, change from one traffic transmission slot to another, e.g., in accordance with an implemented hopping sequence.

Quality of service information recovery module 326 recovers quality of service information corresponding to a communications link from a second wireless terminal to the first wireless terminal, e.g., a mobile device, from a received signal. Transmission request detection module 328 detects a transmission request from the second wireless terminal to the first wireless terminal 300 from a received signal. Detected transmission request 350 is an output of module 328, while recovered quality of service information 352 is an output of module 326. In some embodiments, the quality of service information and the transmission request are received in separate signals, while in other embodiments the quality of service information and the transmission request are received in a single signal.

In some embodiments, the quality of service information is a function of the type of data waiting to be transmitted by the second wireless terminal to the first wireless terminal 300. In some embodiments, the quality of service information is a function of the amount of data waiting to be transmitted by the second wireless terminal to the first wireless terminal.

Transmission request response power level determination module 332 determines a request response transmission power level based on the received quality of service information. Determined request response power level 362 is an output of module 332. In some embodiments, the transmission request response power level determination module 332 is configured to increase the request response transmission power level from a previously determined request response transmission power level when the quality of service information indicates an increase in a quality of service corresponding to the communications link from the second wireless terminal to the first wireless terminal. In some embodiments, the transmission request response power level determination module 332 is configured to decrease the request response transmission power level from a previously determined request response transmission power level when the quality of service information indicates a decrease in a quality of service corresponding to the communications link from the second wireless terminal to the first wireless terminal.

Minimum power level determination sub-module 338, included in some embodiments, determines a minimum request response transmission power level based on the received power level of the corresponding transmission request. Minimum request response transmission power level 360 is an output of sub-module 338. Power level adjustment sub-module 340, included in some embodiments, is configured to decrease the request response transmission power level from a previously determined request response transmission power level when: i) the previously determined request response transmission power level exceeds the determined minimum request response transmission power level and ii) the received recovered quality of service information indicates a decrease in a quality of service corresponding to the communications link from the second wireless terminal to the first wireless terminal 300. Previous QoS information 356, previous request response power level information 358 and determined minimum request response transmission power level 360 are inputs to power level adjustment sub-module 340.

Receiver yielding module 330 makes a decision whether or not to transmit a request response to a received transmission request directed to first wireless terminal 300. Receiver yielding decision 354 is an output of receiver yielding module 330. A decision not to receiver yield is a decision to proceed with the indented requested traffic transmission. When the decision is not to receiver yield, transmission request response power level determination 332 determines the power level of the request response signal. By using an adjustable request response power level, one can impact transmitter yielding decisions of other connections, e.g., lower priority connections, thus changing the likelihood that the intended traffic transmission on its own link can be successfully recovered. Thus the determined value of the transmission request response power level can, and sometimes does, affect interference levels experienced by first wireless terminal 300 will regard to recovering traffic directed to first wireless terminal 300.

Request response generation module 334 generates a request response signal, e.g., an RX echo signal, indicating a positive response to the received traffic transmission request directed to first wireless terminal 300, when the receiver yielding module 330 decides not the yield. Request response transmitter control module 336 controls the wireless transmitter module 304 to transmit, at the determined request response transmission power level, the generated request response in response to the received transmission request, when the receiver yielding module 330 decides not to yield.

Figure 4:
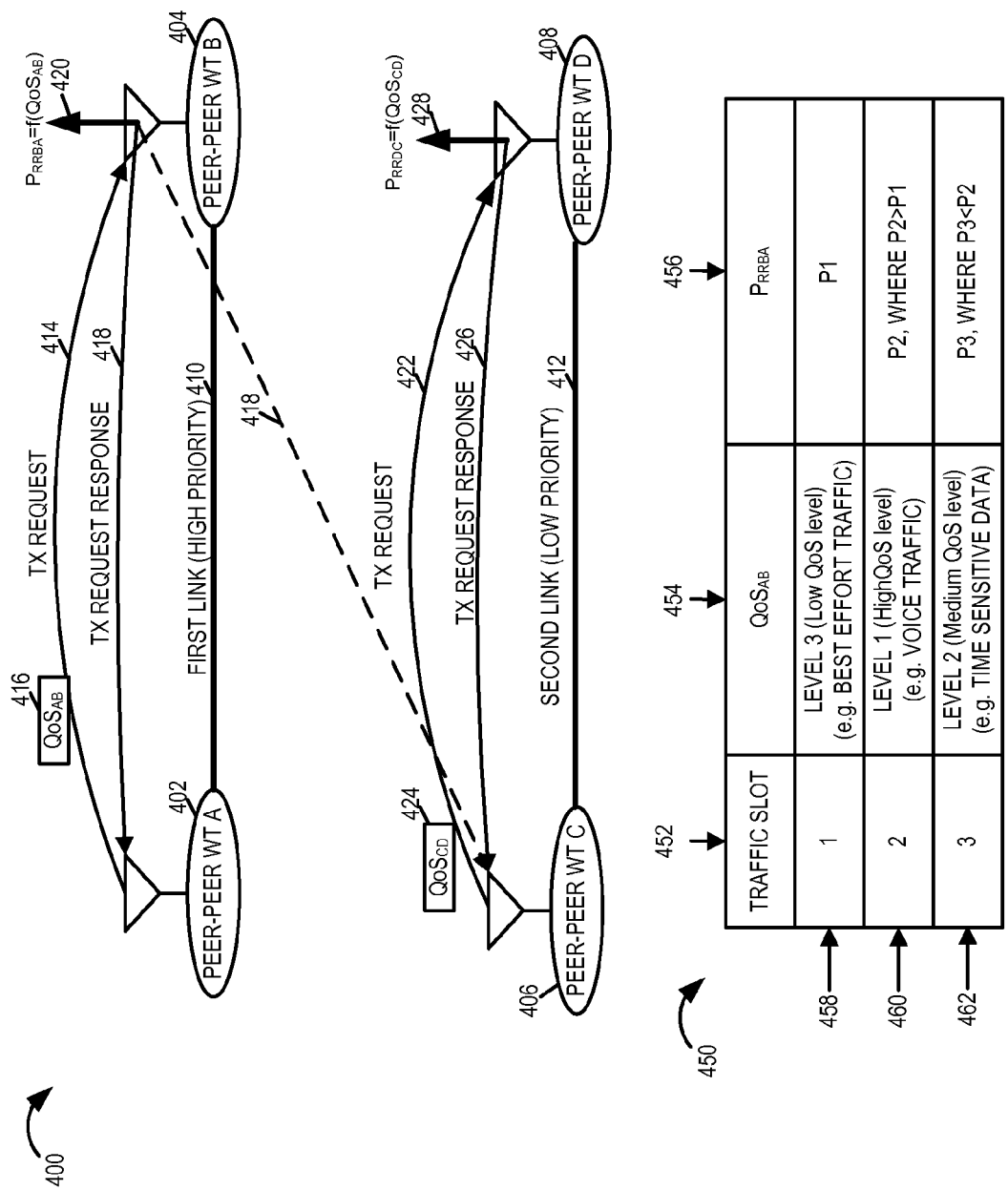
FIG. 4 is a drawing illustrating exemplary wireless terminals, exemplary peer to peer communications links and exemplary signaling, and a table listing exemplary request response signal power level variation based on quality of service information used to affect transmitter yielding decisions.

FIG. 4 is a drawing 400 illustrating exemplary wireless terminals, exemplary peer to peer communications links and exemplary signaling, and a table 450 listing exemplary request response signal power level variation based on quality of service information used to affect transmitter yielding decisions. Drawing 400 illustrates four exemplary peer-peer wireless terminals (WT A 402, WT B 404, WT C 406, and WT D 408). WTs (402, 404, 406, 408) are, e.g., any of the peer to peer WTs of FIG. 1. WT B 404 is, e.g., WT 300 of FIG. 3 and/or a wireless terminal implementing a method in accordance with flowchart 200 of FIG. 2. There is a first peer to peer communications link 410 between WT A 402 and WT B 404; and there is a second peer to peer communications link 412 between WT C 406 and WT D 408. For the purposes of the example, assume that the priority of the first communications link 410 is higher than the priority of the second communications link 412. Accordingly, WT C 406 makes transmitter yielding decisions based on request response signals from higher priority link WT B 404.

For the purpose of this example, assume that WT A 402 wants to transmit traffic to WT B 404 in the same traffic slot using the same air link resource, e.g., traffic segment, that WT C 406 wants to transmit traffic to WT D 408. Also assume that scheduling decisions, e.g., receiver yielding decisions and transmitter yielding decisions are performed in a decentralized manner.

WT A 402 transmits transmission request 414 to WT B 404. The transmission request 414 conveys quality of service information $QoS_{AB}$ 416. WT C 406 transmits transmission request 422 to WT D 408. The transmission request 422 conveys quality of service information $QoS_{CD}$ 424. In some other embodiments, the quality of service information is communicated in a separate signal from the transmission request.

Assume that neither WT B 404 nor WT D 408 decide to perform receiver yielding, and both generate request response signals. WT B 404 generates request response signal 418 which is transmitted at power level $P_{RRBA}$ 420, where $P_{RRBA}$ 420 is a function of $QoS_{AB}$ 416. WT D 408 generates request response signal 426 which is transmitted at power level $P_{RRDC}$ 428, where $P_{RRDC}$ 428 is a function of $QoS_{CD}$ 424. WT C 406, detects the request response signal 426 corresponding to its own link 412 and the request response signal 418 corresponding to higher priority link 410, and makes a transmitter yielding decision based on the received signals (418, 426). The transmitter yielding methodology is such that an increase in the $P_{RRBA}$ 420, other conditions remaining constant, increases that likelihood the WT C 406 will transmitter yield and refrain from transmitting traffic in the traffic slot. Thus WT B 404 by increasing its request response power, e.g., in response to a higher QoS level for its own link, can effectively increase the likelihood that lower priority links will transmitter yield. This can increase that likelihood that the traffic signaling on the first link 410 will be successfully communicated.

Table 450 illustrates three exemplary traffic slots, which may correspond to subsequent iterations of drawing 400. First column 452 identifies the traffic slot, second column 454 identifies $QoS_{AB}$ 454 which may be QoS 416 of drawing 400, and third column 456 identifies $P_{RRBA}$ which may be $P_{RRBA}$ 420 of drawing 400. First row 458 identifies that in traffic slot 1, the $QoS_{AB}$ indicates level 3, which is a low QoS level, which corresponds, e.g., to best effort traffic, and the request response power level $P_{RRBA}$ is value P1, where P1 is a positive value. Second row 460 identifies that in traffic slot 1, the $QoS_{AB}$ indicates level 1, which is a high QoS level, which corresponds, e.g., to voice traffic, and the request response power level $P_{RRBA}$ is value P2, where P2>P1, and P2 is a positive value. Third row 462 identifies that in traffic slot 3, the $QoS_{AB}$ indicates level 2, which is a medium QoS level, which corresponds, e.g., to time sensitive data traffic, and the request response power level $P_{RRBA}$ is value P3, where P3<P2, and P3 is a positive value.

In this example, a QoS level has been associated with a type of traffic intended to be communicated. In some embodiments QoS is a function of the amount of data waiting to be transmitted. In some embodiments, determining a request response transmission power includes determining a minimum request response transmission power based on the received power of the corresponding transmission request and decreasing the transmission power from a previously transmitted request response transmission power level when i) the previously determined request response power level exceeds the determined minimum request response transmission power level and ii) the quality of service information indicates a decrease in the a quality of service corresponding to the communications link.

Figure 5:
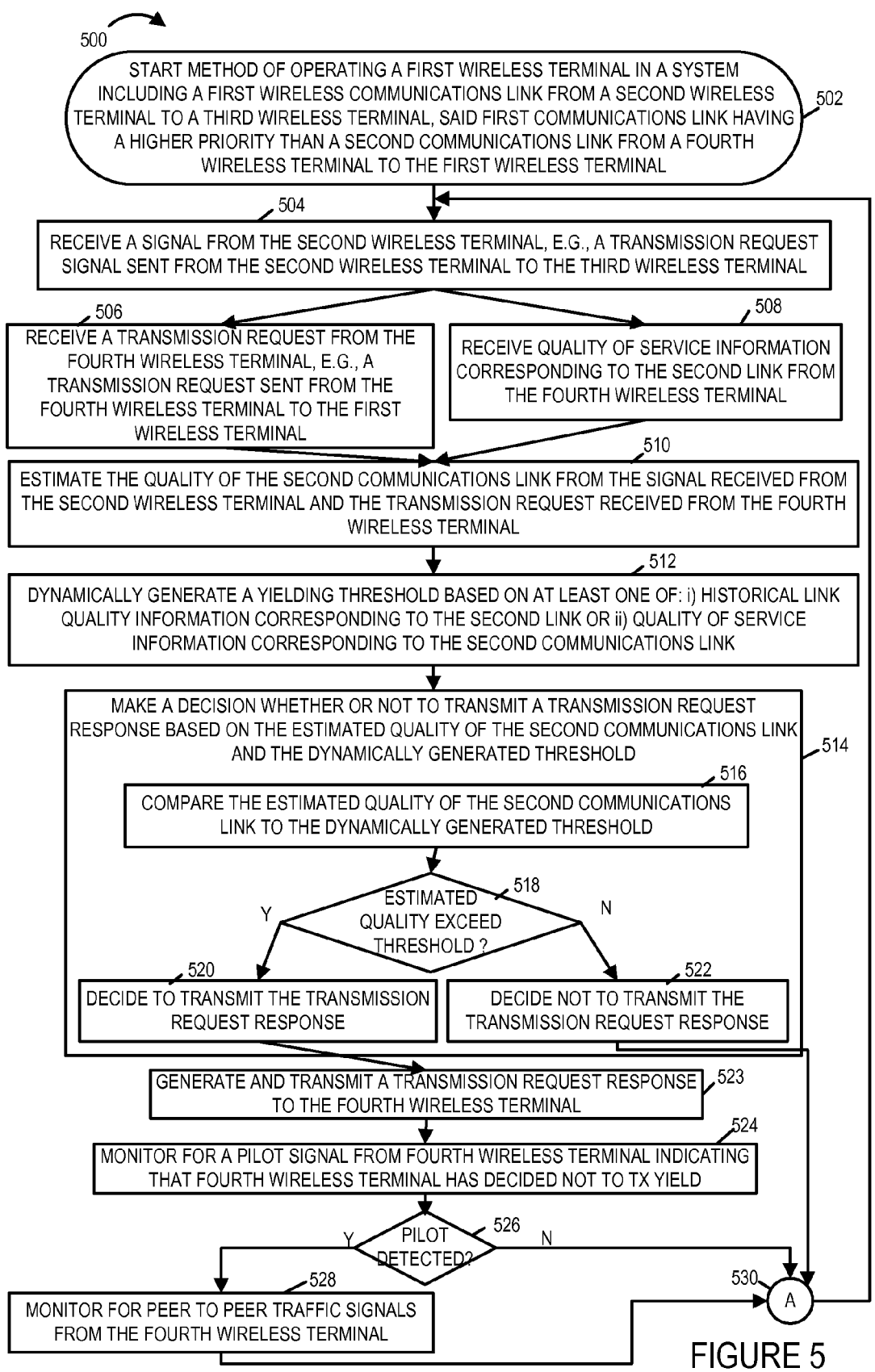
FIG. 5 is a flowchart of an exemplary method of operating a first wireless terminal in a system including a first wireless link from a second wireless terminal to a third wireless terminal, said first communications link having a higher priority than a second communications link from a fourth wireless terminal to the first wireless terminal.

FIG. 5 is a flowchart 500 of an exemplary method of operating a first wireless terminal in a system including a first wireless communications link from a second wireless terminal to a third wireless terminal, said first communications link having a higher priority than a second communications link from a fourth wireless terminal to the first wireless terminal. The first, second, third and fourth wireless terminals are, e.g., mobile wireless terminals supporting peer to peer communications. Operation starts in step 502 where the first wireless terminal is powered on and establishes the second communications link with the fourth wireless terminal. Operation proceeds from step 502 to step 504.

In step 504, the first wireless terminal receives a signal from the second wireless terminal, e.g., a transmission request signal sent from the second wireless terminal to the third wireless terminal. Operation proceeds from step 504 to step 506 and step 508. In step 506 the first wireless terminal receives a transmission request from the fourth wireless terminal, e.g., a transmission request sent from the fourth wireless terminal to the first wireless terminal. In step 508 the first wireless terminal receives quality of service information corresponding to the second link from the fourth wireless terminal. In some embodiments, the received quality of service information is a function of the amount of data waiting to be transmitted by the fourth wireless terminal to the first wireless terminal. In some embodiments, the quality of service information indicates a quality of service level corresponding to a type of traffic waiting at the fourth wireless terminal to be transmitted to the first wireless terminal.

In some embodiments, the transmission request of step 506 and the quality of service information of step 508 are communicated in the same signal. In some other embodiments, the transmission request of step 506 and the quality of service information of step 508 are communicated in different signals.

Operation proceeds from steps 506 and 508 to step 510, in which the first wireless terminal estimates the quality of second communications link from the signal received from the second wireless terminal of step 504 and the transmission request received from the fourth wireless terminal. In some embodiments, the estimated quality of the second communications link is a function of a current communications rate supported by the second communications link. In some embodiments the estimated quality of the second communications link is a function of a current signal to noise ratio of the second communications link. Then, in step 512 the first wireless terminal dynamically generates a yielding threshold, e.g., a receiver (RX) yielding threshold, based on at least one of: i) historical link quality information corresponding to the second communications link or ii) quality of service information corresponding to the second communications link. In various embodiments, dynamically generating a yielding threshold includes generating a lower threshold than a previous threshold when the received quality of service information indicates an increase in a quality of service level corresponding to the second communications link. In various embodiments, dynamically generating a yielding threshold includes generating a higher threshold than a previous threshold when the received quality of service information indicates a decrease in a quality of service level corresponding to the second communications link. In some embodiments, historic link quality information includes an average data rate supported by the second communications link during a previous time interval. The average data rate is, e.g., an exponential based average data rate or a moving window average data rate. The previous time interval, in some embodiments, includes only time intervals in which data transmission actually occurred, e.g., data transmission time intervals where no yielding occurred with respect to the second communications link. Alternatively, the previous time interval, in some embodiments, includes each of the estimated supported rates for intervals where data transmission occurred as well as the estimated supported rates for intervals where yielding occurred. In some such embodiments, an estimated supported rate corresponding to a particular transmission interval is weighted differently, in computing the average data rate supported, depending upon whether data transmission occurred or yielding occurred with respect to the particular transmission interval. Operation proceeds from step 512 to step 514.

In step 514 the first wireless terminal makes a decision whether or not to transmit a transmission request response based on the estimated quality of the second communications link and the dynamically generated threshold. Step 514 includes sub-steps 516, 518, 520 and 522. In sub-step 516 the first wireless terminal compares the estimated quality of second communications link to the dynamically generated threshold. If the estimated quality of the second communications link exceeds the dynamically generated threshold, then operation proceeds from sub-step 518 to sub-step 520; otherwise, operation proceeds from sub-step 518 to sub-step 522.

Returning to sub-step 520, in sub-step 520 the first wireless terminal decides to transmit the transmission request response. Operation proceeds from sub-step 520 to step 523.

Returning to sub-step 522, in sub-step 522 the first wireless terminal decides not to transmit the transmission request response. Operation proceeds from sub-step 522 to connecting node A 530.

Returning to step 523, in step 523 the first wireless terminal generates and transmits a transmission request response to the fourth wireless terminal. Operation proceeds from step 523 to step 524. In step 524 the first wireless terminal monitors for a pilot signal from the fourth wireless terminal indicating that the fourth wireless terminal has decided not to transmitter (TX) yield and intends to transmit traffic data to the first wireless terminal. Operation proceeds from step 524 to step 526. In step 526, if the first wireless terminal has detected a pilot signal from the fourth wireless terminal indicating that the fourth wireless terminal has decided to proceed with its intended traffic transmission to the first wireless terminal, then operation proceeds from step 526 to step 528; otherwise, operation proceeds from step 526 to connecting node A 530.

Returning to step 528, in step 528 the first wireless terminal monitors for peer to peer traffic signals from the fourth wireless terminal, e.g., in a traffic segment corresponding to the received transmission request of step 506 and the transmitted request response of step 521. In step 528, the first wireless terminal is operated to receive the peer to peer to peer traffic signals from the fourth wireless terminal and is operated to attempt to recover the traffic data being communicated. Operation proceeds from step 528 to connecting node A 530. Operation proceeds from connecting node A 530 to step 504.

Figure 6:
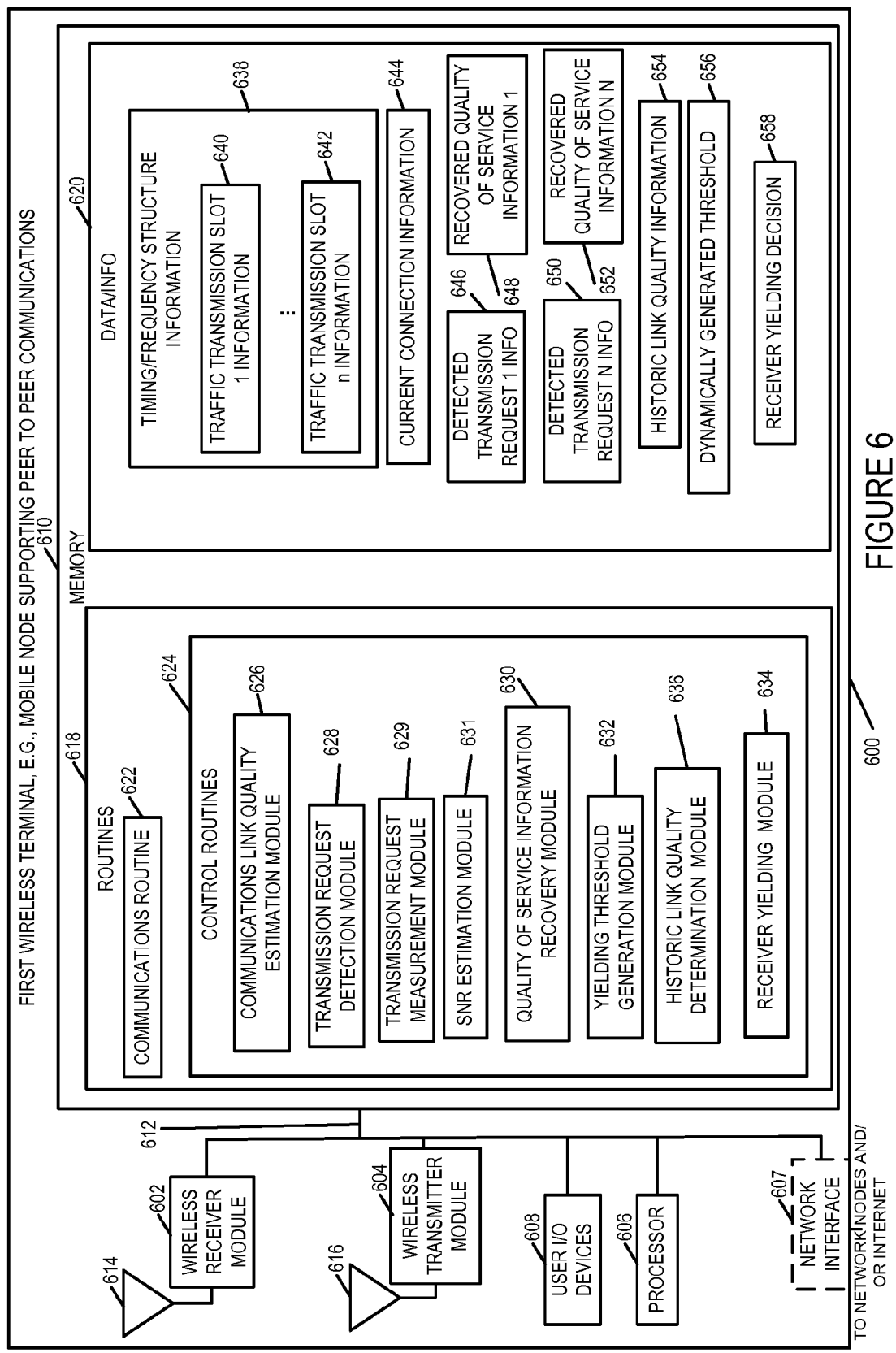
FIG. 6 is a drawing of an exemplary first wireless terminal, e.g., a mobile node supporting peer to peer communications in accordance with an exemplary embodiment.

FIG. 6 is a drawing of an exemplary first wireless terminal 600, e.g., a mobile node supporting peer to peer communications in accordance with an exemplary embodiment. The first wireless terminal 600 is, e.g., a wireless terminal in a system including a first wireless communications link from a second wireless terminal to a third wireless terminal, said first communications link having a higher priority than a second communications link from a fourth wireless terminal to the first wireless terminal 600. Exemplary first wireless terminal 600 includes a wireless receiver module 602, a wireless transmitter module 604, a processor 606, user I/O devices 608 and a memory 610 coupled together via a bus 612 over which the various elements may interchange data and information. In some embodiments, first wireless terminal 600 also includes network interface 607 which is also coupled to bus 612. Network interface 607, when implemented, allows first wireless terminal 600 to be coupled to network nodes and/or the Internet via a backhaul network.

Memory 610 includes routines 618 and data/information 620. The processor 606, e.g., a CPU, executes the routines 618 and uses the data/information 620 in memory 610 to control the operation of the first wireless terminal 600 and implement methods, e.g., the method of flowchart 500 of FIG. 5.

User I/O devices 608 include, e.g., microphone, keyboard keypad, mouse, switches, camera, speaker, display, etc. User I/O device 608 allow an operator of first wireless terminal 600 to input data/information, access output data/information and control at least some functions of the first wireless terminal 600.

Wireless receiver module 602, e.g., an OFDM and/or CDMA receiver, is coupled to receive antenna 614 via which the first wireless terminal 600 receives signals from other communications devices. Received signals include connection establishment signals, connection maintenance signals, transmission request signals and traffic signals. Wireless receiver module 602, at times, receives a signal from the second wireless terminal, e.g., a transmission request signal from the second wireless terminal directed to the third wireless terminal, and a transmission request signal from the fourth wireless terminal, e.g., a transmission request signal from the fourth wireless terminal directed to the first wireless terminal. In some embodiments, a transmission request signal conveys quality of service information. In some embodiments, quality of service information corresponding to a connection and/or a transmission request is communicated in a separate signal from the transmission request signal and is also received by wireless receiver module 602.

Wireless transmitter module 604, e.g., an OFDM and/or CDMA transmitter, is coupled to transmit antenna 616 via which the first wireless terminal 600 transmits signals to other communications devices. Transmitted signals include connection establishment signals, connection maintenance signals, and traffic transmission request response signals. In some embodiments, the same antenna is used for receiver and transmitter.

Routines 618 include a communications routine 622 and control routines 624. The communications routine 622 implements the various protocols used by the first wireless terminal 600. Control routines 624 include a communications link quality estimation module 626, a transmission request detection module 628, a transmission request measurement module 629, a signal to noise ratio estimation module 631, a quality of service information recovery module 630, a yielding threshold generation module 632, a receiver yielding module 634 and a historic link quality determination module 636.

Data/information 620 includes timing/frequency structure information 638, current connection information 644, detected transmission request information (detected transmission request 1 information 646, . . . , detected transmission request N information 650), corresponding recovered quality of service information (recovered quality of service information 1 648, . . . , recovered quality of service information N 652), historic link quality information 654, a dynamically generated threshold 656, and a receiver yielding decision 658. Timing/frequency structure information 638 includes information corresponding to a plurality of traffic transmission slots in a recurring peer to peer timing structure (traffic transmission slot 1 information 640, . . . , traffic transmission slot n information 642). Traffic transmission slot 1 information 640 includes information identifying air link resources used for conveying transmission request signals, air link resources used for conveying request response signals, and air link resources used for conveying traffic signals, e.g., a traffic segment. Current connection information 644 includes information identifying a currently held connection of first wireless terminal 600, e.g., a connection identifier associated with a connection between a fourth wireless terminal and the first wireless terminal 600. In some embodiments, a particular air link resource in a transmission request block and a particular air link resources in a transmission request response block are associated with a connection identifier, e.g., in accordance with the timing/frequency structure information. A priority level associated with a connection identifier may, and sometimes does, change from one traffic transmission slot to another, e.g., in accordance with an implemented hopping sequence.

Communications link quality estimation module 626 estimates the quality of a communications link between another wireless terminal and first wireless terminal 600. For example, communications link quality estimation module 626 estimates the quality of the second communications link from the signal received from the second wireless terminal and the transmission request response received from the fourth wireless terminal. In some embodiments, the signal received from the second wireless terminal is a transmission request signal sent from the second wireless terminal to the third wireless terminal. In various embodiments, the communication link quality estimation module 626 estimates the quality of the second communications link based on a current communications rate supported by the second communications link. In various embodiments, the communication link quality estimation module 626 estimates the quality of the second communications link based on a current signal to noise ratio of the second communications link. Signal to noise ratio estimation module 631 determines a current SNR of the second communications link, e.g., using measurements of detected transmission request signals.

Yielding threshold generation module 632 dynamically generates a yielding threshold, e.g., a receiver (RX) yielding threshold, based on at least one of: historic link quality information corresponding to a link between another device, e.g., the fourth wireless terminal, and the first wireless terminal, e.g., the second link, and ii) quality of service information corresponding to the link between the another device, e.g., the fourth device, and the first wireless terminal, e.g., the second link.

In some embodiments, the yielding threshold generation module 632 is configured to generate a lower threshold than a previous threshold when the quality of service information indicates an increase in a quality of service corresponding to the second communications link. In some embodiments, the yielding threshold generation module 632 is configured to generate a higher threshold than a previous threshold when the quality of service information indicates a decrease in a quality of service corresponding to the second communications link.

Transmission request detection module 628 detects received transmission request signals, e.g., a transmission request from the second wireless terminal intended for the third wireless terminal and a transmission request from the fourth wireless terminal intended for the first wireless terminal 600. Transmission request measurement module 629 measures the received power level of detected transmission request signals. Detected transmission request 1 information 646 and detected transmission request N information 650 include outputs of detection module 628 and/or measurement module 629.

Quality of service information recovery module 630 recovers quality of service information corresponding to connections and/or to transmission requests from received signals. In some embodiments, quality of service information is conveyed in transmission request signals, while in other embodiments quality of service information is conveyed in separate signals from the transmission request signals. In some embodiments, the quality of service information is a function of the amount of data waiting to be transmitted by the fourth wireless terminal to the first wireless terminal 600. In some embodiments, the quality of service information indicates a quality of service level corresponding to a type of traffic waiting at the fourth wireless terminal to be transmitted to the first wireless terminal. Recovered quality of service information 1 648 and recovered quality of service information N 652 represents outputs of recovery module 630.

Receiver yielding module 634 makes a decision whether or not to transmit a transmission request response to a receive transmission request directed to first wireless terminal 600 based on the estimated quality of the communications link corresponding to the request, e.g., the second communications link, and the dynamically generated threshold. Receiver yielding decision 648 is an output of module 634. In various embodiments, the receiver yielding module 634 is configured to compare the estimated quality of the second communications link to the dynamically generated threshold and decide to transmit the transmission request response when the comparison indicates that the estimated quality of the second communications link exceeds the dynamically generated threshold.

Historic link quality determination module 636 determines an average data rate supported by a communications link between another device, e.g., the fourth device, and the first wireless terminal, e.g., the second communications link, during a previous time interval. In some embodiments, module 636 determines an exponential based average data rate, while in other embodiments module 636 determines a moving window average data rate. In some embodiments, the average calculation uses rate information for only time intervals in which data transmission actually occurred on the link, e.g., where no yielding occurred on the second link. In some other embodiments, the average calculation includes using each of the estimated supported rates for intervals where transmission occurred as well as the supported rates for intervals where yielding occurred. In some such embodiments, different weighting is used for a particular estimated supported rate depending upon whether or not yielding occurred.

Figure 7:
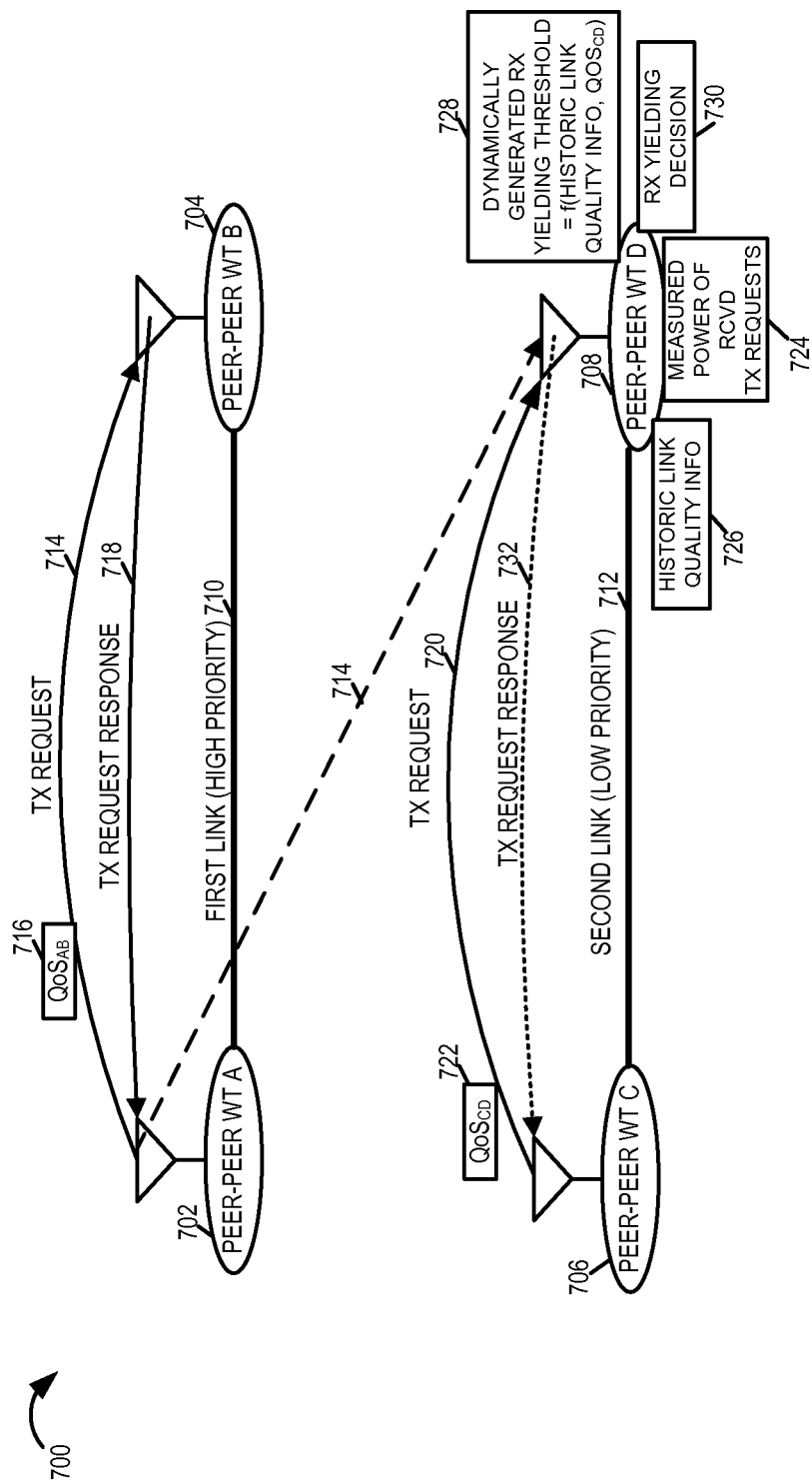
FIG. 7 is a drawing illustrating exemplary wireless terminals, exemplary peer to peer communications links and exemplary signaling used to illustrate aspects of receiver yielding in accordance with some embodiments.

FIG. 7 is a drawing 700 illustrating exemplary wireless terminals, exemplary peer to peer communications links and exemplary signaling used to illustrate aspects of receiver yielding in accordance with some embodiments. Drawing 700 illustrates four exemplary peer-peer wireless terminals (WT A 702, WT B 704, WT C 706, and WT D 708). WTs (702, 704, 706, 708) are, e.g., any of the peer to peer WTs of FIG. 1. WT D 708 is, e.g., WT 600 of FIG. 6 and/or a wireless terminal implementing a method in accordance with flowchart 500 of FIG. 5. There is a first peer to peer communications link 710 between WT A 702 and WT B 704; and there is a second peer to peer communications link 712 between WT C 706 and WT D 708. For the purposes of the example, assume that the priority of the first communications link 710 is higher than the priority of the second communications link 712

For the purpose of this example, assume that WT A 702 wants to transmit traffic to WT B 704 in the same traffic slot using the same air link resource, e.g., traffic segment, that WT C 706 wants to transmit traffic to WT D 708. Also assume that scheduling decisions, e.g., receiver yielding decisions and transmitter yielding decisions are performed in a decentralized manner.

WT A 702 transmits transmission request 714 to WT B 704. The transmission request 714 conveys quality of service information $QoS_{AB}$ 716. WT C 706 transmits transmission request 720 to WT D 708. The transmission request 720 conveys quality of service information $QoS_{CD}$ 722. In some other embodiments, the quality of service information is communicated in a separate signal from the transmission request. In some embodiments, the quality of service information $QoS_{CD}$ 722 is a function of the amount of data waiting to be transmitted by the WT C 706 to WT D 708. In some embodiments, the quality of service information $QoS_{CD}$ 722 indicates a type of traffic data, e.g., voice, other time sensitive traffic data, time insensitive traffic data, etc., waiting to be transmitted by the WT C 706 to WT D 708.

Assume that WT B 704 decides not to perform receiver yielding since it is the highest priority link in its vicinity, and thus generates request response signal 718 and transmits signal 718 to WT A 702. The request response signal 718 notifies WT A 702, that from the perspective of WT B 704, it is ok to proceed with the intended requested traffic transmission to WT B 704.

WT D 708 measures the receive power of received transmission requests (714, 720) as indicated by block 724 and determines an estimated receive signal quality value if the intended traffic transmission from WT C 706 is allowed to proceed in the presence of the expected traffic transmission from WT A 702 to WT B 704. The estimated receive signal quality value is, e.g., a signal to noise ratio for the second communications link 712. Wireless terminal D 726 includes stored historic link quality information 726. In accordance with a feature of some embodiments, WT D 708 dynamically generates a receiver yielding threshold based on historic link quality information 726 and the quality of service information $QoS_{CD}$ 722 as indicated by block 728. WT D 708 then makes a receiver yielding decision as indicated by block 730, e.g., deciding to RX yield if the estimated receive signal quality is below the dynamically generated threshold 728. If WT decides to RX yield, then WT D 708 does not transmit TX request response 732 to WT C 706. However, if WT D 708 decides not to RX yield then WT D 708 generates and transmits transmission request response signal 732 to WT C 706 which indicates to WT C 706 that, from WT D's perspective, it is ok to proceed with its intended traffic transmission to WT D 708.

In some embodiments dynamically generating a threshold includes generating a lower threshold than a previous threshold, e.g., corresponding to a prior traffic slot, when the quality of service information $QoS_{CD}$ 722 indicates an increase in the quality of service corresponding to the second communications link 712. Thus such a lower threshold, in response to higher QoS needs of second link 712, makes it less likely that WT D 708 will RX yield for this slot and more likely that the intended traffic transmission from WT C 706 to WT D 708 will occur for this traffic transmission slot, given other conditions remaining constant.

In some embodiments dynamically generating a threshold includes generating a higher threshold than a previous threshold, e.g., corresponding to a prior traffic slot, when the quality of service information $QoS_{CD}$ 722 indicates a decrease in the quality of service corresponding to the second communications link 712. Thus such a higher threshold, in response to lower QoS needs of second link 712, makes it more likely that WT D 708 will RX yield for this slot and less likely that the intended traffic transmission from WT C 706 to WT D 708 will occur for this traffic transmission slot, given other conditions remaining constant.

In some embodiments, the historic link quality information 726 includes an average data rate supported by the communications link 712 during a previous time interval. In some embodiments, an exponential type average is used. In some embodiments, a moving window average is used. In various embodiments, only data rates corresponding to time intervals for which data transmission over the second link 712 actually occurred, e.g., where no yielding occurred with regard to the second link 712, are used in computing the average data rate. In some other embodiments data rates corresponding to each of a plurality of prior traffic transmission intervals are used in computing the average data rate irrespective of whether or not yielding occurred. In some such embodiments, a rate for an interval in which yielding occurred is weighted differently than a rate corresponding to an interval in which data transmission actually occurred in computing the average data rate.

One exemplary receiver (RX) yielding approach will now be described. Consider link Y will RX yield if $R_Y(t) < \max(\beta(Y) \cdot R_A(Y,t), R_{RT})$, where $R_Y(t)$ is the rate estimate of link Y for slot t, $\beta(Y)$ is a function of QoS information for link Y, $R_A(Y, t)$ is an average rate such as exponential average or sliding window average for link Y computed for slot t based on prior slots, and $R_{RT}$ is a RX yield rate threshold, e.g., a fixed RX yielding rate threshold. $\beta(Y)$ is a scaling factor for the rate average based on past information, while $R_{RT}$ is a fixed minimum acceptable rate used for the RX yielding decision. In the context of FIG. 7, consider that the second link 712 is link Y, the equation $R_Y(t) < \max(\beta(Y) \cdot R_A(Y,t), R_{RT})$ can be used for the RX yielding decision of block 730, $R_Y(t)$ is a rate estimate based on the measured power of the received transmission requests for slot t as indicated by block 724, $R_A(Y,t)$ can correspond to the historical link quality information 726, and $\beta(Y)$ can correspond to to $QoS_{CD}$ 722 or be derived from $QoS_{CD}$ 722. In some embodiments, $\beta(Y)$ is a function of QoS information locally known to the receiver device making the yielding decision, e.g., the amount of unused and/or unused receiver buffer capacity.

In some embodiments, both $\beta(Y)$ and $R_{RT}$ are functions of QoS information pertaining to the link for which the receiver yielding decision is being performed, e.g., $QoS_{CD}$ information.

In some embodiments, yielding parameters and yielding limits are in terms of SNR instead of using rate information.

Figure 8:
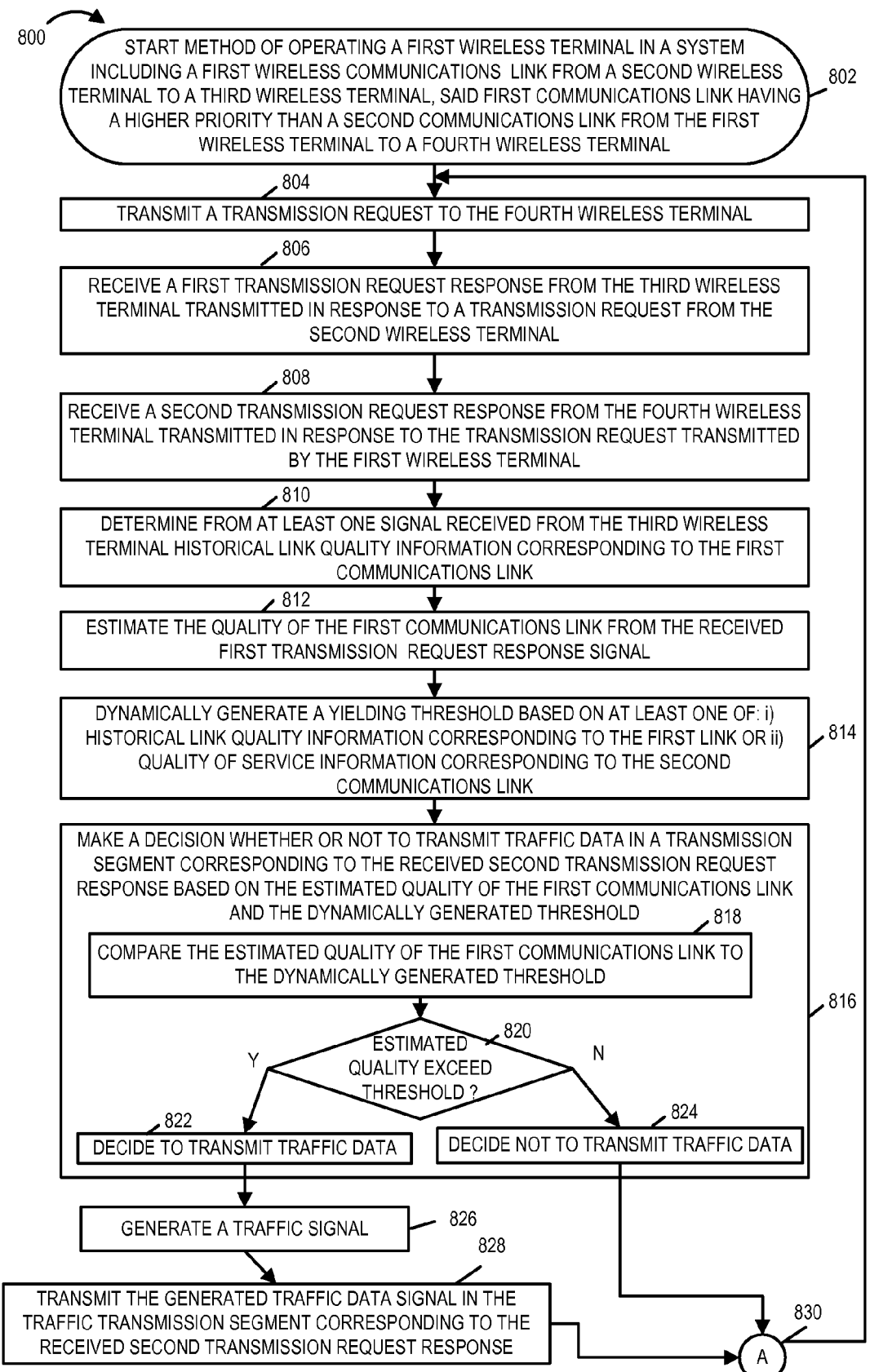
FIG. 8 is a flowchart of an exemplary method of operating a first wireless terminal in a system including a first wireless link from a second wireless terminal to a third wireless terminal, said first communications link having a higher priority than a second communications link from a first wireless terminal to a fourth wireless terminal.

FIG. 8 is a flowchart 800 of an exemplary method of operating a first wireless terminal in a system including a first wireless communications link from a second wireless terminal to a third wireless terminal, said first communications link having a higher priority than a second communications link from the first wireless terminal to a fourth wireless terminal. The first, second, third and fourth wireless terminals are, e.g., mobile communications devices supporting peer to peer communications. Operation of the exemplary method starts in step 802 where the first wireless terminal is powered on, initialized, and establishes a second communications link with the fourth wireless terminal. Operation proceeds from step 802 to step 804.

In step 804 the first wireless terminal transmits a transmission request to the fourth wireless terminal, e.g., in a transmission request resource associated with the second communications link in a transmission request block associated with a traffic transmission segment. Operation proceeds from step 804 to step 806.

In step 806 the first wireless terminal receives a first transmission request response from the third wireless terminal transmitted in response to a transmission request from the second wireless terminal, and in step 808 the first wireless terminal receives a second transmission request response from the fourth wireless terminal transmitted in response to the transmission request transmitted by the first wireless terminal in step 804. In some embodiments, both the first transmission request response and second transmission request response are received in the same transmission request response block associated with the same traffic transmission segment. Thus the third wireless terminal has signaled that from its perspective the second wireless terminal may proceed with its intended traffic transmission directed to the third wireless terminal on the traffic transmission segment, and the fourth wireless terminal has signaled that from its perspective the first wireless terminal may proceed with its intended traffic transmission to the fourth wireless terminal on the same traffic transmission segment. Operation proceeds from step 808 to step 810.

In step 810 the first wireless terminal determines from at least one signal received from the third wireless terminal historical link quality information corresponding to the first communications link. In some embodiments, the at least one signal is a broadcast signal from the third wireless terminal which communicates historical rate information. In some embodiments, determining from at least one signal received from the third wireless terminal includes accumulating link quality information from multiple signals sent from the third wireless terminal to the second wireless terminal, each of said multiple signals communicating link quality information corresponding to a different period of time. In some embodiments, the link quality information includes one of: link signal to noise ratio (SNR) information and rate information.

Operation proceeds from step 810 to step 812. In step 812 the first wireless terminal estimates the quality of the first communications link from the received first transmission request response signal. In some embodiments the estimate of the quality of the first communications link is also a function of the intended transmission power of the intended traffic signals from the first wireless terminal to the fourth wireless terminal. In various embodiments, the first wireless terminal determines the intended transmission power of the intended traffic signals from the first wireless terminal to the fourth wireless terminal based on an estimate of the second link communications channel. In some embodiments, the estimate of the quality of the first communications link is a function of the received second transmission request response signal. The estimate of quality of the first communications link is, e.g., an estimate of SNR or an estimate of data rate. Operation proceeds from step 812 to step 814.

In step 814 the first wireless terminal dynamically generates a yielding threshold, e.g., a transmitter yielding threshold, based on at least one of: i) historical link quality information corresponding to the first link or ii) quality of service information corresponding to the second communications link. In some embodiments, the quality of service information is a function of the amount of data waiting to be transmitted by the first node to the fourth node. In some embodiments, the quality of service information indicates a quality of service level corresponding to a type of traffic waiting at the first node to be transmitted to the fourth node. Some examples, of different types of traffic which may be associated with different quality of service levels include voice traffic, other latency dependent data traffic, and best effort data traffic. In various embodiments, at times, dynamically generating a threshold includes generating a lower threshold than a previous threshold when the quality of service information indicates an increase in a quality of service level corresponding to the second communications link. Thus by lowering the yielding threshold the first wireless terminal is less likely to perform transmitter yielding and more likely to be able to transmit traffic data in the slot and to meet the higher quality of service level needs for the second communications link. In various embodiments, at times, dynamically generating a threshold includes generating a higher threshold than a previous threshold when the quality of service information indicates a decrease in a quality of service level corresponding to the second communications link.

In some embodiments, the historical link quality information includes an average data rate supported by the first communications link during a previous time interval. The average data rate is, e.g., one of an exponential based average data rate and a moving window average data rate. In some embodiments, the average data rate is determined corresponding to only time intervals in which no transmitter yielding by the third communications device occurred and traffic data was communicated on the first communications link. In some embodiments, the average data rate is determined corresponding to time intervals in which data was communicated on the first communications link and the first wireless terminal made a transmitter yielding decision. In some such embodiments, different weighing factors are used in calculating the average data rate depending upon whether or not the first wireless terminal decided to transmitter yield in a particular previous interval in which traffic data was communicated on the first communications link. Operation proceeds from step 814 to step 816.

In step 816 the first wireless terminal makes a decision whether or not to transmit traffic data in a transmission segment corresponding to the received second transmission request response based on the estimated quality of the first communications link and the dynamically generated threshold. Step 816 includes sub-steps 818, 820, 822 and 824. In sub-step 818 the first wireless terminal compares the estimated quality of the first communications link to the dynamically generated threshold. Then, in sub-step 820, if the estimated quality of the first communications link exceeds the dynamically generated threshold, operation proceeds from sub-step 820 to sub-step 822; otherwise, operation proceeds from sub-step 820 to sub-step 822. Returning to sub-step 822, in sub-step 822 the first wireless terminal decides to transmit traffic data. Operation proceeds from sub-step 822 to step 826. Returning to sub-step 824, in sub-step 824 the first wireless terminal decides not to transmit traffic data. Operation proceeds from sub-step 824 to connecting node A 830.

Returning to step 826, in step 826 the first wireless terminal generates a traffic signal, and in step 828 the first wireless terminal transmits the generated traffic data signal in the traffic transmission segment corresponding to the received second transmission request response. Operation proceeds from step 828 to connecting node A 830. Operation proceeds from connecting node A 830 to the input of step 804, e.g., where the first wireless terminal transmits another transmission request response to the fourth wireless terminal corresponding to another traffic slot.

Figure 9:
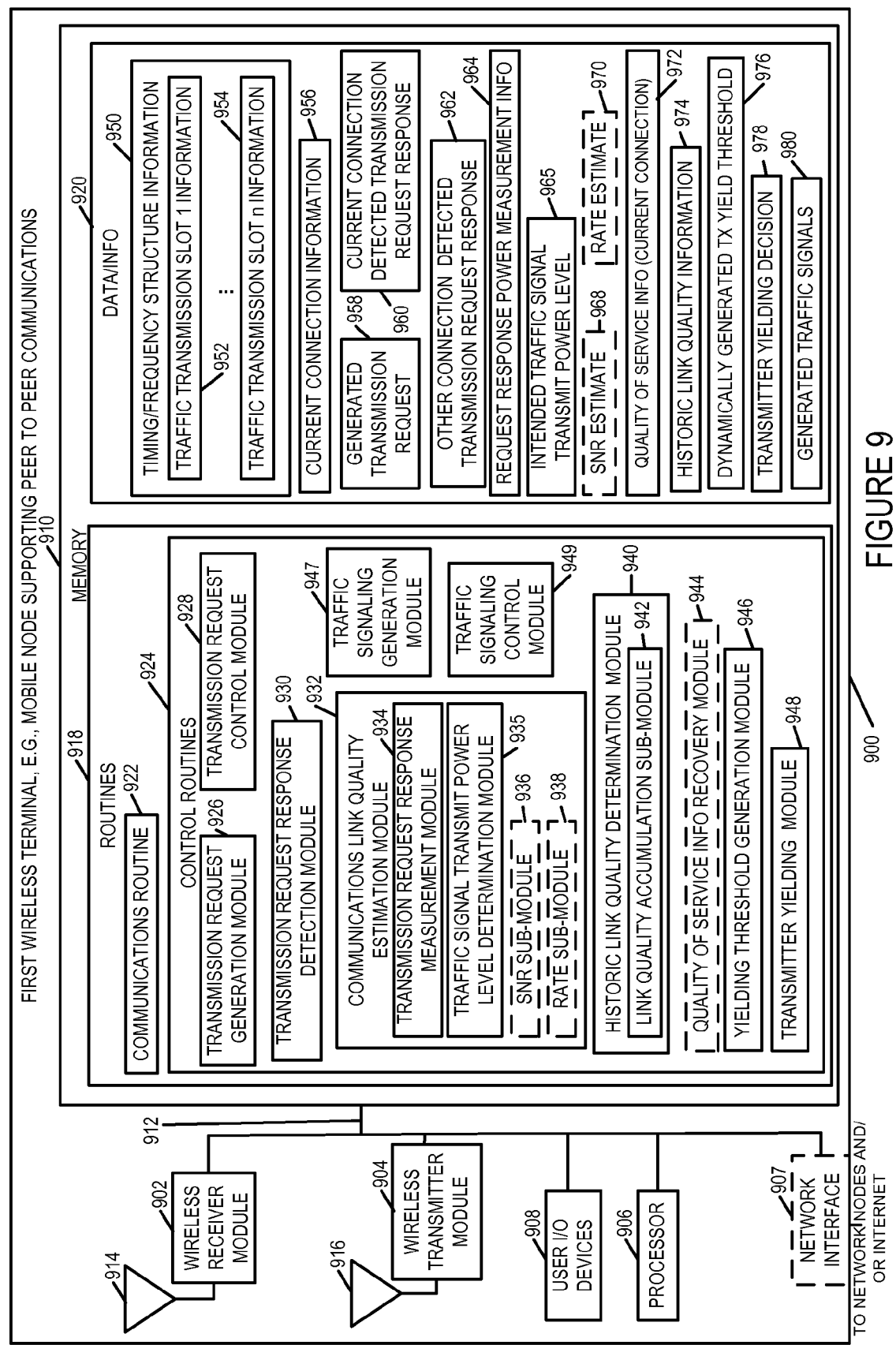
FIG. 9 is a drawing of an exemplary first wireless terminal, e.g., a mobile node supporting peer to peer communications in accordance with an exemplary embodiment.

FIG. 9 is a drawing of an exemplary first wireless terminal 900, e.g., a mobile node supporting peer to peer communications in accordance with an exemplary embodiment. The first wireless terminal 900 is, e.g., a wireless terminal in a system including a first wireless communications link from a second wireless terminal to a third wireless terminal, said first communications link having a higher priority than a second communications link from the first wireless terminal 900 to a fourth wireless terminal. Exemplary first wireless terminal 900 includes a wireless receiver module 902, a wireless transmitter module 904, a processor 906, user I/O devices 908 and a memory 910 coupled together via a bus 912 over which the various elements may interchange data and information. In some embodiments, first wireless terminal 900 also includes network interface 907 which is also coupled to bus 912. Network interface 907, when implemented, allows first wireless terminal 900 to be coupled to network nodes and/or the Internet via a backhaul network.

Memory 910 includes routines 918 and data/information 920. The processor 906, e.g., a CPU, executes the routines 918 and uses the data/information 920 in memory 910 to control the operation of the first wireless terminal 900 and implement methods, e.g., the method of flowchart 800 of FIG. 8.

User I/O devices 908 include, e.g., microphone, keyboard keypad, mouse, switches, camera, speaker, display, etc. User I/O device 908 allow an operator of first wireless terminal 900 to input data/information, access output data/information and control at least some functions of the first wireless terminal 900.

Wireless receiver module 902, e.g., an OFDM and/or CDMA receiver, is coupled to receive antenna 914 via which the first wireless terminal 900 receives signals from other communications devices. Received signals include connection establishment signals, connection maintenance signals, and transmission request response signals. Wireless receiver module 902, at times, receives (i) a first transmission request response from the third wireless terminal transmitted in response to a transmission request from the second wireless terminal and (ii) and a second transmission request response from the fourth wireless terminal transmitted in response to a transmission request from the first wireless terminal 900.

Wireless transmitter module 904, e.g., an OFDM and/or CDMA transmitter, is coupled to transmit antenna 916 via which the first wireless terminal 900 transmits signals to other communications devices. Transmitted signals include connection establishment signals, connection maintenance signals, and traffic transmission request signals and traffic signals. For example, after having establishing a peer to peer connection with the fourth wireless terminal, corresponding to a traffic transmission slot in the timing/frequency structure, first wireless terminal's wireless transmitter module 904 transmits a transmission request to the fourth wireless terminal. Then, if the first wireless terminal 900 receives a request response from the fourth wireless terminal in response to the transmitted request and decides not to perform transmitter yielding, the first wireless terminal's transmitter module 904 transmits traffic signals to the fourth wireless terminal. In some embodiments the same antenna is used for receiver and transmitter.

Routines 918 include a communications routine 922 and control routines 924. The communications routine 922 implements the various protocols used by the first wireless terminal 900. Control routines 924 include a transmission request generation module 926, a transmission request control module 928, a transmission request response detection module 930, a communications link quality estimation module 932, a historic link quality determination module 940, a yielding threshold generation module 946, a transmitter yielding module 948, a traffic signaling generation module 947 and a traffic signaling control module 949. Communications link quality estimation module 932 includes a transmission request response measurement module 934 and a traffic signal transmit power level determination module 935. In some embodiments, communications link quality estimation module 932 includes one or more of SNR sub-module 936 and rate sub-module 938. Historic link quality determination module 940 includes a link quality accumulation sub-module 942.

Data/information 920 includes timing/frequency structure information 950, current connection information 956, generated transmission request 958, current connection detected transmission request response 960, other connection detected transmission request response 962, request response power measurement information 964, intended traffic signal transmit power level 965, quality of service information corresponding to the current connection 972, historic link quality information 974, dynamically generated transmitter yielding threshold 976, transmitter yielding decision 978, and generated traffic signals 980. In some embodiments data/information 920 includes one or more of SNR estimate 968 and rate estimate 970. Timing/frequency structure information 950 includes information corresponding to a plurality of traffic transmission slots in a recurring peer to peer timing structure (traffic transmission slot 1 information 952, . . . , traffic transmission slot n information 954). Traffic transmission slot 1 information 952 includes information identifying air link resources used for conveying transmission request signals, air link resources used for conveying request response signals, and air link resources used for conveying traffic signals, e.g., a traffic segment. Current connection information 956 includes information identifying a currently held connection of first wireless terminal 900, e.g., a connection identifier associated with a connection between first wireless terminal 900 and the fourth wireless terminal. In some embodiments, a particular air link resource in a transmission request block and a particular air link resources in a transmission request response block are associated with a connection identifier, e.g., in accordance with the timing/frequency structure information. A priority level associated with a connection identifier may, and sometimes does, change from one traffic transmission slot to another, e.g., in accordance with an implemented hopping sequence.

Transmission request generation module 926 generates a traffic transmission request signal requesting a wireless terminal with which first wireless terminal 900 has a current connection for consent to transmit traffic signals to that wireless terminal in a traffic segment corresponding to the request. For example, transmission request generation module generates a traffic transmission request signal, e.g., generated transmission request 958, requesting the fourth wireless terminal for its consent to transmit traffic to the fourth wireless terminal, where both the request and the traffic segment associated with the request correspond to one of the traffic transmission slots identified by timing/frequency structure information 950. In some embodiments, the generated request is generated to also convey quality of service information or information that can be used to derive quality of service information. Transmission request control module 928 controls the wireless transmitter module 904 to transmit a generated transmission request in accordance with the timing/frequency structure information 950. In some embodiments, corresponding to a particular connection identifier, a particular air link resource, e.g., one or more OFDM tone-symbols, in a request block corresponding to a traffic transmission slot is dedicated for a particular connection identifier.

Transmission request response detection module 930 detects received transmission request response signals which may, and sometimes does, include a current connection detected transmission request response 960 and an other connection detected transmission request response 962. The current connection detected transmission request response 960 is, e.g., a request response corresponding to a transmitted generated transmission request 958. Current connection detected transmission request response is, e.g., a request response from the fourth wireless terminal directed to the first wireless terminal 900. The other connection detected transmission request response 962 is, e.g., a request response from the third wireless terminal directed to the second wireless terminal.

Communications link quality estimation module 932 estimates the quality of a higher priority communications link than its own communications link. For example, the communications link estimation module 932 estimates the quality of a higher priority communication link than its own assuming that traffic communications were to occur concurrently on both communications links using the same traffic segment. Communications link quality estimation module 932 estimates the quality of a higher priority communications link than its own link from transmission request response signals received corresponding to the higher priority communications link. For example, communications link quality estimation module 932 estimates the quality of the first communication link between the second and third wireless terminals from the first request response signal received from the third wireless terminal, e.g., signal 962.

In some embodiments, the communications link quality estimation module 932 uses a determined intended traffic signal transmission power level, e.g., information 965, corresponding to second communications link intended traffic signals to determine the first link quality estimate. Traffic signal transmit power level determination module 935 determines intended traffic signal transmit power level 965 based on a channel estimation between the first wireless terminal 900 and the fourth wireless terminal. In some embodiments, the communications link quality estimation module 932 estimates the quality of the first communication link as a function of $1/((P_1)(P_2))$, where $P_1$ is the measured receive power level of the request response signal from the higher priority link and where $P_2$ is the intended transmit power of traffic signals on its own, lower priority, link.

Transmission request response measurement module 934 measures the received power level of detected transmission request response signals of interest. Detected request response signals (960, 962) are inputs to measurement module 934, while request response power measurement information 964 is an output of measurement module 934.

SNR sub-module 936 uses the request response power measurement information 962 to determine SNR information, e.g., SNR estimate 968, corresponding to the higher priority link of interest for which a transmitter yielding decision is to be performed by transmitter yielding module 948. Rate sub-module 938 uses the request response power measurement information 962 to determine data rate information, e.g., rate estimate 970, corresponding to the higher priority link of interest for which a transmitter yielding decision is to be performed by transmitter yielding module 948.

Historic link quality determination module 940 determines from at least one signal received from a higher priority link, historical link quality information corresponding to the higher priority communications link. For example, historic link quality determination module 940 determines from at least one signal received from the third wireless terminal historical link quality information corresponding to the first communication link which is between the second and third wireless terminals. In some embodiments, the at least one signal is a broadcast signal, e.g., a broadcast signal from the third wireless terminal which communicates historical rate information or a broadcast signal from the third wireless terminal which communicates historical SNR information. Historic link quality information 974 is an output of module 940 and used as an input of yielding threshold generation module 946.

In some embodiments, historic link quality determination module 940 determines an average link quality, e.g. an average data rate, supported by the higher priority communications link of interest, e.g. the first communication link, during a previous time interval. The average is, e.g., one of an exponential based average and a moving window average. In some embodiments in determining the average information is considered during time intervals in which no yielding occurred, e.g., data transmission occurred on the higher priority, e.g. first communications link concurrently with data transmission on WT 900's communications link, e.g., the second communications link. In some other embodiments, in determining the average, information is considered during times intervals where data transmission occurred on the higher priority, e.g., first communications link, irrespective of the transmitter yielding decision of WT 900. In some such embodiments, determining the average includes using different weighting values, and a weighting value for a particular prior traffic slot is selected depending whether or not transmitter yielding occurred in that prior traffic slot.

Link quality accumulation sub-module 942 accumulates link quality information from multiple signals sent corresponding to a link of interest, e.g., a higher priority link between the second and third wireless terminals. For example, link quality accumulation sub-module 942 accumulates link quality information from multiple signals sent from the third wireless terminal to the second wireless terminal, each of said multiple signals communicating link quality information corresponding to a different period of time, e.g., a different traffic transmission slot. In some embodiments, the link quality information is one of link SNR information and link rate information.

Quality of service information recovery 944, is included in some embodiments, e.g., some embodiments in which an intended receiver of traffic signals transmits quality of service information such as a quality of service level corresponding to its own communications link, e.g., as part of or with a traffic transmission request response signal. In some embodiments, the quality of service information, e.g., quality of service level, for the third wireless terminal's communications link corresponding to a traffic transmission slot is determined by the first wireless terminal 900 and thus known by first wireless terminal 900. Quality of service information 972 for the current connection of first wireless terminal 900 is an output of quality of service information recovery module 944 in embodiments, where recovery module 944 is used. In other embodiments, current connection quality of service information 972 is determined and stored by first wireless terminal 900. In some embodiments, the quality of service information 972 is a function of the amount of data waiting to be transmitted by the first wireless terminal 900 to the device with which it has a connection, e.g., by the first wireless terminal 900 to the fourth wireless terminal. In some embodiments, the quality of service information indicates a quality of service level corresponding to a type of traffic waiting at the third node. Exemplary different types of traffic which may be associated with different quality of service levels include, e.g., voice traffic, other latency dependent traffic, and best effort traffic.

Yielding threshold generation module 946 dynamically generates a yielding threshold, e.g., a transmitter (TX) yielding threshold, based on at least one of: i) historic link quality information corresponding to a higher priority link, e.g., the first communications link, and ii) quality of service information corresponding to current connection communications link, e.g. the second communications link. Thus quality of service information 972 and/or historic link quality information 974 are inputs to yielding threshold generation module 946. Dynamically generated TX yielding threshold is an output of yielding threshold generation module 946 and an input of transmitter yielding module 948.

In some embodiments, the yielding threshold generation module 946 is configured to dynamically generate a lower threshold than a previous threshold when the quality of service information indicates an increase in a quality of service level corresponding to the first wireless terminal 900 current connection communication link, e.g., the second communications link. For example, assume that the quality of service level for WT 900's link has increased from a prior traffic slot due to higher priority traffic now waiting in WT 900's transmit queue, by decreasing the dynamically generated transmitter yielding threshold WT 900 increases the likelihood that it will not yield and increases the likelihood that it will be allowed transmit traffic in this slot, given other conditions remaining constant. In some embodiments, the yielding threshold generation module 946 is configured to dynamically generate a higher threshold than a previous threshold when the quality of service information indicates a decrease in a quality of service level corresponding to the wireless terminal 900 current connection communication link, e.g., the second communications link.

Transmitter yielding module 948 makes a decision whether or not to transmit traffic data in a traffic transmission segment corresponding to a received traffic transmission request response directed to wireless terminal 900, e.g., received second transmission request response from the fourth wireless terminal, e.g. detected request response 960. The transmitter yielding module 948 makes its decision based on the estimated quality of higher priority communications link under consideration, e.g., the first communication link, and the dynamically generated threshold.

In some embodiments, the transmitter yielding module 948 is configured to compare an estimated quality of a higher priority communications link, e.g., the first communication link, to a dynamically generated threshold and decides to transmit traffic data, e.g., to the fourth communications device in the traffic segment corresponding to the received request response from the fourth wireless terminal, when said comparison indicates that the estimated quality of the higher priority link, e.g., first communication link, exceeds the dynamically generated threshold. In some embodiments, the transmitter yielding module 948 is configured to decide to yield and refrain from transmitting if the comparison indicates that higher priority link, e.g., first communication link, does not exceed the dynamically generated threshold. Dynamically generated TX yield threshold 976 and one or more of SNR estimate 968 and/or rate estimate 970 are inputs to transmitter yielding module 948, while transmitter yielding decision 978 is an output of transmitter yielding module 948. Transmitter yielding decision 978 is an input to one or more of traffic signal generation module 947 and traffic signaling control module 949.

Traffic signal generation module 947 generates generated traffic signals 980, e.g., peer to peer traffic signals intended to be transmitted from first wireless terminal 900 to the fourth wireless terminal in a traffic segment. Traffic signaling control module 949 controls the wireless transmitter module 904 to transmit the generated traffic signals 980 on the appropriate air link resources of the traffic segment associated with previously transmitted request as indicated by information 950, when the transmitter yielding module 948 decides not to yield. Traffic signaling control module 949 controls the wireless transmitter module 904 to refrain from transmitting signals on the appropriate air link resources of the traffic segment of interest as indicated by information 950, when the transmitter yielding module 948 decides to yield.

Figure 10:
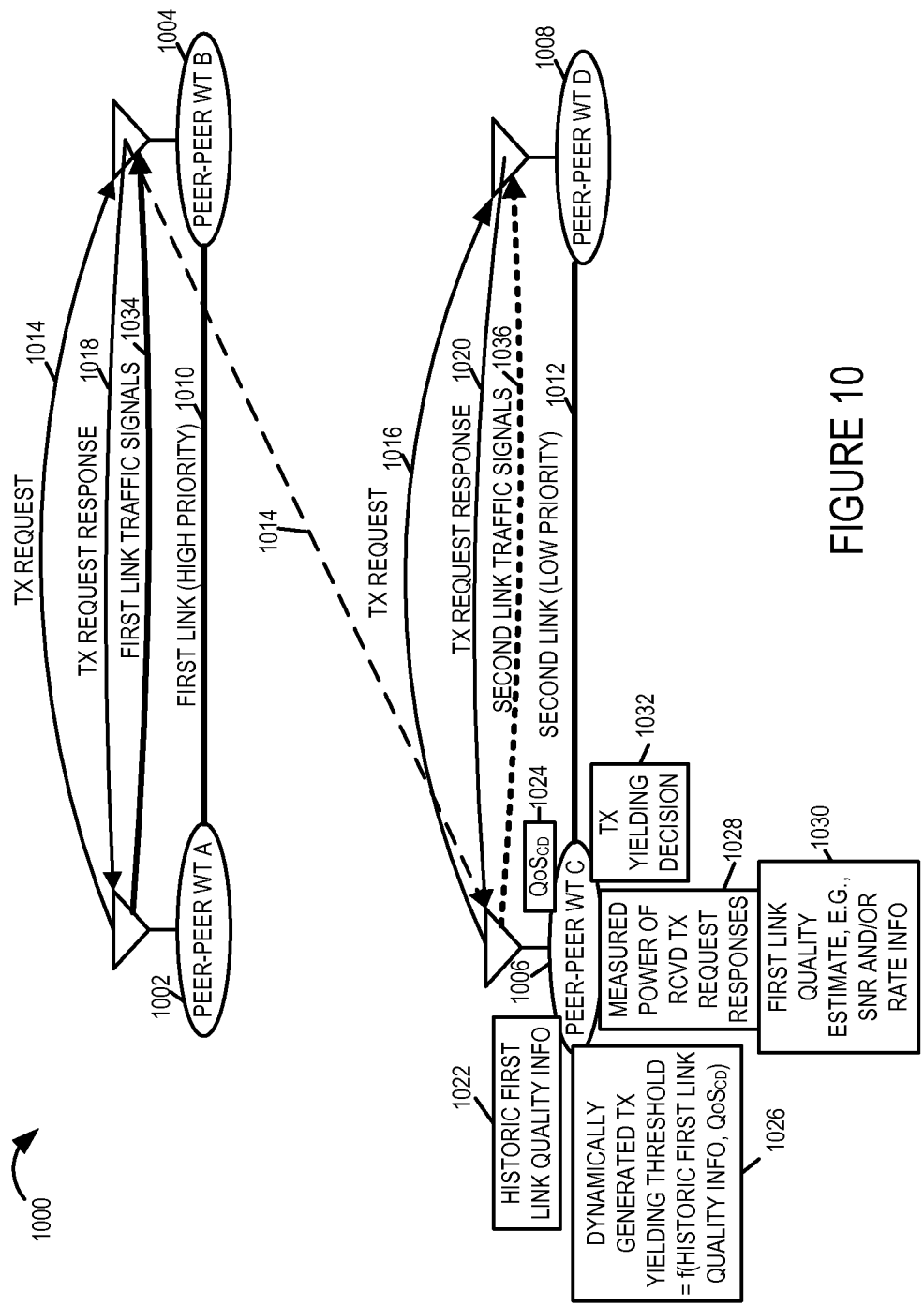
FIG. 10 is a drawing illustrating exemplary wireless terminals, exemplary peer to peer communications links and exemplary signaling used to illustrate aspects of transmitter yielding in accordance with some embodiments.

FIG. 10 is a drawing 1000 illustrating exemplary wireless terminals, exemplary peer to peer communications links and exemplary signaling used to illustrate aspects of transmitter yielding in accordance with some embodiments. Drawing 1000 illustrates four exemplary peer-peer wireless terminals (WT A 1002, WT B 1004, WT C 1006, and WT D 1008). WTs (1002, 1004, 1006, 1008) are, e.g., any of the peer to peer WTs of FIG. 1. WT C 1006 is, e.g., WT 900 of FIG. 9 and/or a wireless terminal implementing a method in accordance with flowchart 800 of FIG. 8. There is a first peer to peer communications link 1010 between WT A 1002 and WT B 1004; and there is a second peer to peer communications link 1012 between WT C 1006 and WT D 1008. For the purposes of the example, assume that the priority of the first communications link 1010 is higher than the priority of the second communications link 1012.

For the purpose of this example, assume that WT A 1002 wants to transmit traffic to WT B 1004 in the same traffic slot using the same air link resource, e.g., traffic segment, that WT C 1006 wants to transmit traffic to WT D 1008. Also assume that scheduling decisions, e.g., receiver yielding decisions and transmitter yielding decisions are performed in a decentralized manner.

WT A 1002 transmits transmission request 1014 to WT B 1004. WT C 1006 transmits transmission request 1016 to WT D 1018. Assume that neither WT B 704 nor WT D 1008 decide to receiver yield. Thus WT B 1004 generates and transmits transmission request response signal 1018 directed to WT A 1002, and WT D 1008 generates and transmits transmission request response signal 1020 directed to WT C 1006. The request response signal 1018 notifies WT A 1002, that from the perspective of WT B 1004 it is ok to proceed with the intended requested traffic transmission to WT B 1004. The request response signal 1020 notifies WT C 1006, that from the perspective of WT D 1008 it is ok to proceed with the intended requested traffic transmission to WT D 1008.

WT C 1006 receives and detects (i) the request response signal 1020 corresponding to its own connection and (ii) the request response signal 1014 corresponding the higher priority link. WT C 1006 measures the received power of the received transmission request response signals as indicated by block 1028 and determines a first link quality estimate, e.g., an estimated SNR value or estimated data rate, based on the measured power of the received traffic transmission request response signal 1014, as indicated by block 1030. In some embodiments, determining a first link quality estimate further includes using an intended second link traffic transmission power level value to perform the determination. WT C 1006 determines historic first link quality information 1022, e.g., based on one or more received signals corresponding to the first link. In some embodiments, the determined historic first link quality information is an average value corresponding to prior traffic transmission slots, e.g., a SNR average value or a data rate average value. The average value is, e.g., one of a exponential based average or a sliding window based average. In some embodiments, the historic first link quality information is derived from received signals from WT B 1004, e.g., data rate indicator signals broadcast by WT B 1004 as part of rate scheduling operations in prior traffic transmission slots in which WT A 1002 transmitted traffic data to WT B 1004. In some embodiments in determining the average, information is considered during time intervals in which no yielding occurred, e.g., data transmission occurred on the higher priority first communications link 1010 concurrently with data transmission on the lower priority second communications link 1012. In some other embodiments, in determining the average information is considered during times intervals where data transmission occurred on the higher priority first communications link 1012, irrespective of the transmitter yielding decision of WT C 1006. In some such embodiments, determining the average includes using different weighting values, and a weighting value for a particular prior traffic slot is selected depending whether or not transmitter yielding occurred by WT C 1006 in that prior traffic slot.

WT C 1006 also has $QoS_{CD}$ information 1024, e.g., a QoS level, corresponding to and currently associated with the second link. In some embodiments, WT C 1006 determines the $QoS_{CD}$, e.g., based on the type of traffic waiting to be transmitted and/or the amount of traffic waiting to be transmitted to WT D 1008. In some embodiments, WT D 1008 determines $QoS_{CD}$ 1024 and communicates the information to WT C 1006. In some such embodiments, $QoS_{CD}$ 1024 is communicated to WT C 1006 as part of or with transmission request response 1020. WT C 1006 dynamically generates a transmitter yielding threshold based on the historic first link quality information 1022 and the quality of service information corresponding to the second link $QoS_{CD}$ 1026, as indicated by block 1026.

In some embodiments dynamically generating a threshold includes generating a higher threshold than a previous threshold, e.g., corresponding to a prior traffic slot, when the quality of service information $QoS_{CD}$ 1024 indicates a decrease in the quality of service corresponding to the second communications link 1012. Thus such a higher threshold, in response to lower QoS needs of second link 1012, makes it more likely that WT C 1008 will TX yield for this slot and less likely that the intended traffic transmission from WT C 1006 to WT D 1008 will occur for this traffic transmission slot, given other conditions remaining constant. In some embodiments dynamically generating a threshold includes generating a lower threshold than a previous threshold, e.g., corresponding to a prior traffic slot, when the quality of service information $QoS_{CD}$ 1024 indicates an increase in the quality of service corresponding to the second communications link 1012. Thus such a lower threshold, in response to higher QoS needs of second link 1012, makes it less likely that WT C 1008 will TX yield for this slot and more likely that the intended traffic transmission from WT C 1006 to WT D 1008 will occur for this traffic transmission slot, given other conditions remaining constant.

WT C 1006 makes a transmitter yielding decision based on the first link quality estimate 1030 and the dynamically generated transmitter yielding threshold 1026 as indicated by block 1032. For example, if the first link quality estimate exceeds the dynamically generated threshold, then WT C 1006 decides not to yield and decides to transmit second link traffic signals 1036 to WT D 1008. However, if the first link quality estimate does not exceed the dynamically generated threshold, then WT C 1006 decides to perform transmitter yielding and refrains from transmitting its intended traffic signal 1036.

WT A 1002 corresponding to the highest priority link in the local region and having received transmission request response 1018 in response to its transmission request 1014 transmits peer to peer traffic signals 1034 to WT B 1004 using the traffic segment associated with the requests 1014 and 1016. WT C 1006, corresponding to a lower priority link, conditionally transmits peer to peer traffic signals 1036 depending on its transmitter yielding decision. If WT C 1006 does decide to transmit traffic it uses the same traffic segment as is being used by WT A 1002.

Various TX yielding approaches predict interference cost to a higher priority link if a lower priority link is allowed to transmit traffic on the same air link resource, e.g., traffic segment, concurrently with the higher priority link traffic communications. One exemplary (TX) transmitter yielding approach will now be described. In this approach the yielding limit used in the yielding determination is dynamic and may, and sometimes does, change from one traffic transmission slot to another in accordance with historical information and current conditions. Consider link Y will TX yield if $R_Y^{(Z,Y)}(t) < \max(\alpha(Y) \cdot R_A(Y,t), R_{TT})$, where $R_Y^{(Z,Y)}(t)$ is the rate estimate of link Z for slot t assuming link Y also communicates concurrently using the same air link resource where link Z is a higher priority link than link Y, $\alpha(Y)$ is a scaling value which is a function of information about link Y, e.g., a function of QoS information for link Y, $R_A(Z, t)$ is an average rate such as exponential average or sliding window average for link Z computed for slot t based on prior slots, and $R_{TT}$ is a TX yield rate threshold, e.g., a fixed TX yield rate threshold. $\alpha(Y)$ is a scaling factor for the higher priority link rate average where the higher priority link rate average is based on past information. In some embodiments, $R_{TT}$ is a fixed minimum acceptable rate used for the TX yielding decision. In the context of FIG. 10, consider that the second link 1012 is link Y, the equation $R_Y^{(Z,Y)}(t) < \max(\alpha(Y) \cdot R_A(Z,t), R_{TT})$ can be used for the TX yielding decision of block 1032, $R_Y^{(Z,Y)}(t)$ is a rate estimate based on the measured power of the received transmission requests for slot t as indicated by block 1030, $R_A(Z,t)$ can correspond to the historical link quality information 1022, and $\alpha(Y)$ can be derived from $QoS_{CD}$ 1024.

In some embodiments, $R_A(Z,t)$ is derived from rate feedback information transmitted on link Z, e.g., as part of traffic rate scheduling operations, or rate information characterizing link Z which is broadcast from a link Z device every so often in accordance with a timing structure schedule. Thus the lower priority link, link Y, is made aware, of higher priority link traffic rates.

In some embodiments, both $\alpha(Y)$ and $R_{TT}$ are functions of QoS information pertaining to the link for which the transmitter yielding decision is being performed, e.g., $QoS_{CD}$ information 1022.

Although described in the example about in terms of rates, in some embodiments, yielding parameters and yielding limits are in terms of SNR information instead of using rate information.

Figure 11:
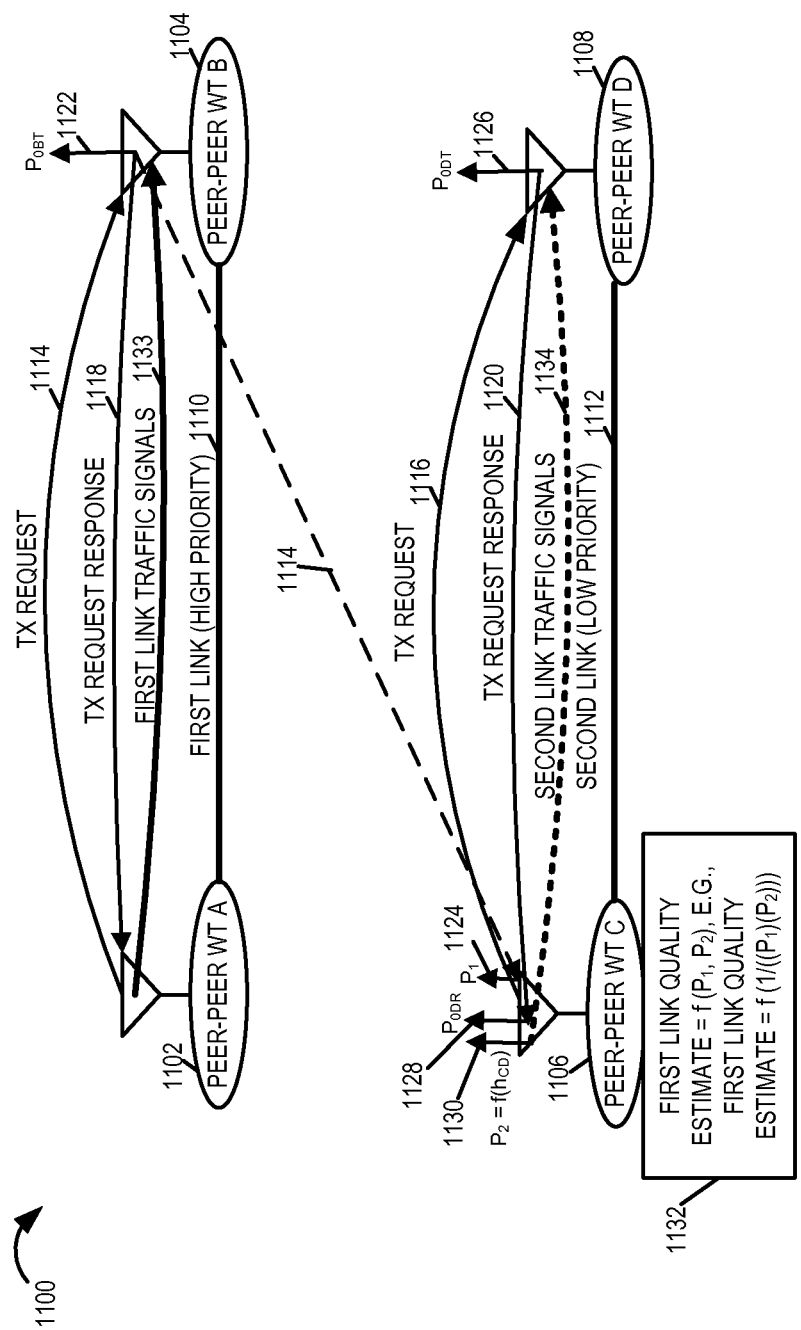
FIG. 11 is a drawing illustrating exemplary wireless terminals, exemplary peer to peer communications links and exemplary signaling used to illustrate aspects of transmitter yielding in accordance with some embodiments.

FIG. 11 is a drawing 1100 illustrating exemplary wireless terminals, exemplary peer to peer communications links and exemplary signaling used to illustrate aspects of transmitter yielding in accordance with some embodiments. Drawing 1100 illustrates four exemplary peer-peer wireless terminals (WT A 1102, WT B 1104, WT C 1106, and WT D 1108). WTs (1102, 1104, 1106, 1108) are, e.g., any of the peer to peer WTs of FIG. 1. WT C 1106 is, e.g., WT 900 of FIG. 9 and/or a wireless terminal implementing a method in accordance with flowchart 800 of FIG. 8. There is a first peer to peer communications link 1110 between WT A 1102 and WT B 1104; and there is a second peer to peer communications link 1112 between WT C 1106 and WT D 1108. For the purposes of the example, assume that the priority of the first communications link 1110 is higher than the priority of the second communications link 1112.

For the purpose of this example, assume that WT A 1102 wants to transmit traffic to WT B 1104 in the same traffic slot using the same air link resource, e.g., traffic segment, that WT C 1106 wants to transmit traffic to WT D 1108. Also assume that scheduling decisions, e.g., receiver yielding decisions and transmitter yielding decisions are performed in a decentralized manner.

WT A 1102 transmits transmission request 1114 to WT B 1104. WT C 1106 transmits transmission request 1116 to WT D 1108. Assume that neither WT B 1104 nor WT D 1108 decide to receiver yield. Thus WT B 1104 generates and transmits transmission request response signal 1118 directed to WT A 1102, and WT D 1108 generates and transmits transmission request response signal 1120 directed to WT C 1006. The request response signal 1118 notifies WT A 1102, that from the perspective of WT B 1104 it is ok to proceed with the intended requested traffic transmission to WT B 1104. The request response signal 1120 notifies WT C 1106, that from the perspective of WT D 1108 it is ok to proceed with the intended requested traffic transmission to WT D 1108. Transmission request response signal 1114 is transmitted by WT B 1104 at transmit power level $P_{OBT}$ 1122. Transmission request response signal 1120 is transmitted by WT D 1108 at transmit power level $P_{ODT}$ 1126.

WT C 1106 receives and detects the transmission request response signal 1120 corresponding to its own connection and measures the received power level of the signal as $P_{ODR}$ 1128. WT C 1106 also receives and detects the request response signal 1114 corresponding to the higher priority link and measures the received power level of the signal as $P_1$ 124. WT C 1006 determines an intended transmit power, $P_2$ 1130, of its intended traffic signals 1134, should it decide to transmit traffic, based on a channel estimate $h_{CD}$ between WT C 1106 and WT D 1108. WT C 1106 determines a first link quality estimate, e.g., an estimated SNR value or estimated data rate, based on the measured power $P_1$ 1124 of received traffic transmission request response signal 1114 and the intended transmit power level $P_2$ 1130 for intended second link traffic signals 1134 as indicated by block 1132. In some embodiments, the first link quality estimate is a function of $(1/((P_1)(P_2)))$. The first link quality estimate, e.g., an estimate of expected receive quality at WT B 1104 if second link traffic signals 1134 are allowed to occur concurrently with first link traffic signals 1133 using the same air link resource, e.g., same traffic segment, is compared to a dynamically generated transmitter yielding threshold to determine whether or not WT C 1106 should perform transmitter yielding. In some embodiments, the dynamically generated transmitter yielding threshold is a function of historical link quality information corresponding to the first link 1110 and quality of service information and/or changes in quality of service information corresponding to the second link 1112.

Figure 12:
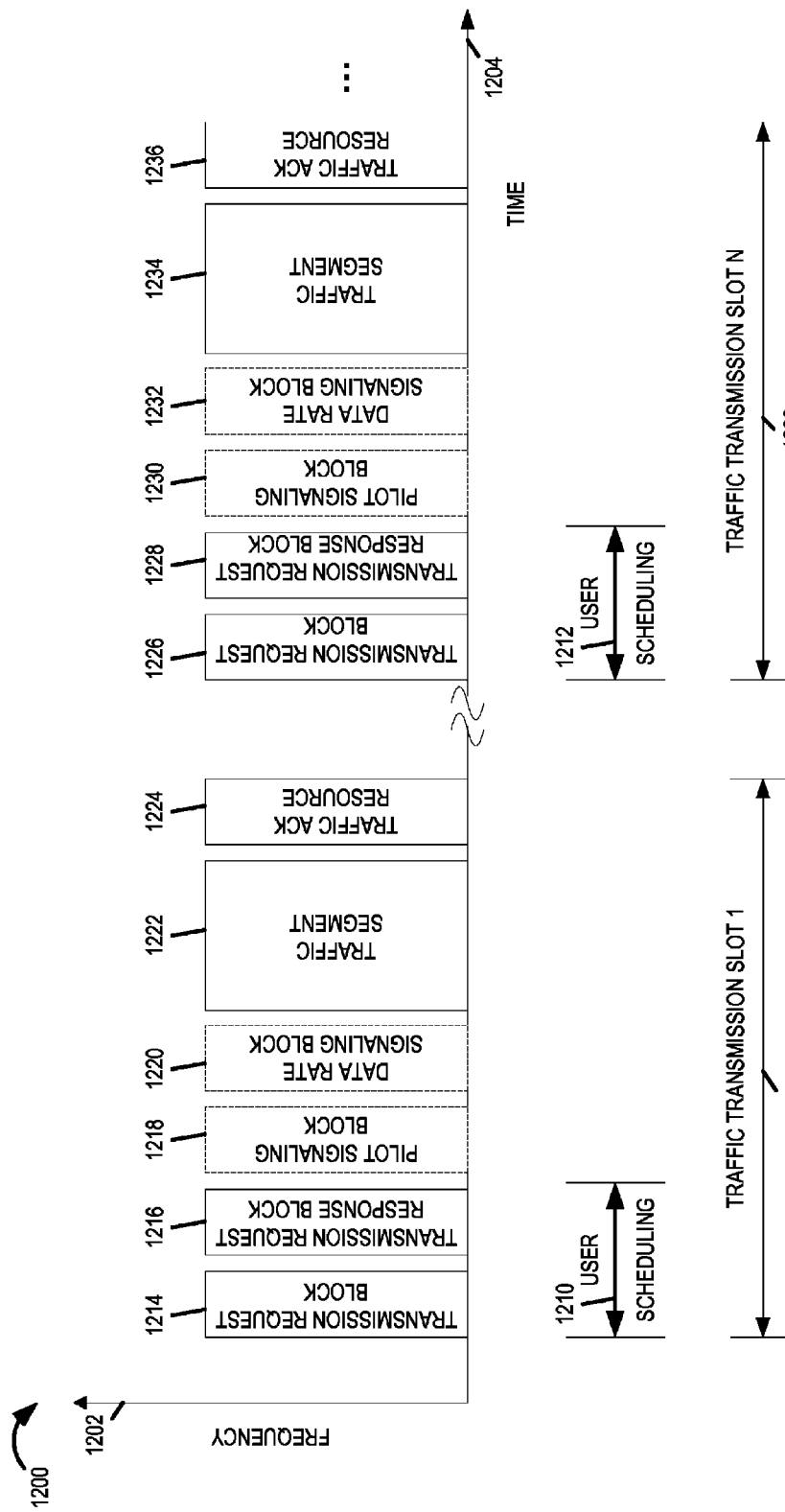
FIG. 12 is a drawing illustrating an exemplary timing and frequency structure used in some embodiments.

FIG. 12 is a drawing 1200 illustrating an exemplary timing and frequency structure used in some embodiments. The exemplary timing/frequency structure may be used in one or more of the wireless terminals described in any of FIGS. 1-11. Drawing 1200 includes a vertical axis 1202 representing frequency, e.g., OFDM tones, and a horizontal axis 1204 representing time, e.g., indexed OFDM symbol transmission time intervals in a recurring timing structure. The recurring timing structure includes a plurality of traffic transmission slots (traffic transmission slot 1 1206, . . . , traffic transmission slot N 1208). Each traffic transmission slot includes a user scheduling portion in which transmission requests are communicated, receiver yielding decisions are performed, transmission request responses are communicated and transmitter yielding decisions are performed. In some embodiments, receiver yielding and/or transmitter yielding includes the generation and use of dynamic yielding thresholds. For example, corresponding to a particular connection a receiver yielding threshold and/or a transmitter yielding threshold may change from one slot to another, e.g., based on historical link quality information and/or quality of service information. Traffic transmission slot 11206 includes user scheduling portion 1210, while traffic transmission slot N 1208 includes user scheduling portion 1212.

Transmission request block 1214, transmission request response block 1216, pilot signaling block 1218, data rate signaling block 1220, traffic segment 1222 and traffic acknowledgment resource 1224 correspond to traffic transmission slot 1 1206. A traffic transmission request to use traffic segment 1222 is conveyed using an air link resource, e.g. one or more OFDM tone-symbols, associated with a connection identifier in transmission request block 1214. A traffic transmission request response in response to a request to use traffic segment 1222, signifying a positive response to the corresponding request, is conveyed using an air link resource, e.g. one or more OFDM tone-symbols, associated with a connection identifier in transmission request response block 1216. Pilot signaling block 1218 and data rate signaling block 1220 are included in some embodiments, but are not included in other embodiments. After the user scheduling 1210, it has been decided as to which wireless terminals are to transmit traffic data in the traffic segment 1222. Those that are scheduled to transmit traffic data in traffic segment 1222 send a pilot signal in pilot signaling block 1218, while those intended to receive traffic signals in the traffic segment 1222 measure the pilots and sent a data rate feedback signal using the data rate signaling block 1220. In some embodiments, data rate feedback information corresponding to a prior transmission slot is used to determine a dynamic transmitter yielding threshold in a current transmission slot.

The scheduled transmitters, determined during the user scheduling 1210, transmit traffic data in the traffic segment 1222. The scheduled receivers of traffic data, in some embodiments, respond with traffic acknowledgment signals in traffic acknowledgment resource 1224, e.g., upon successful recovery of the received traffic data being communicated.

Transmission request block 1226, transmission request response block 1228, pilot signaling block 1230, data rate signaling block 1232, traffic segment 1234 and traffic acknowledgment resource 1236 correspond to traffic transmission slot N 1208. A traffic transmission request to use traffic segment 1234 is conveyed using an air link resource, e.g. one or more OFDM tone-symbols, associated with a connection identifier in transmission request block 1226. A traffic transmission request response in response to a request to use traffic segment 1234, signifying a positive response to the corresponding request, is conveyed using an air link resource, e.g. one or more OFDM tone-symbols, associated with a connection identifier in transmission request response block 1228. In some embodiments, the transmission power level of a traffic transmission requests response signal is a function of quality of service information. Pilot signaling block 1230 and data rate signaling block 1232 are included in some embodiments, but are not included in other embodiments. After the user scheduling 1212, it has been decided as to which wireless terminals are to transmit traffic data in the traffic segment 1234. Those that are scheduled to transmit traffic data in traffic segment 1234 send a pilot signal in pilot signaling block 1230, while the scheduled receivers for traffic segment 1234 measure the pilots and sent a data rate feedback signal using the data rate signaling block 1232. In some embodiments, data rate feedback information corresponding to a prior transmission slot is used to determine a dynamic transmitter yielding threshold in a current transmission slot.

The scheduled transmitters, determined during the user scheduling 1212, transmit traffic data in the traffic segment 1234. The scheduled receivers of traffic data, in some embodiments, respond with traffic acknowledgment signals in traffic acknowledgment resource 1236, e.g., upon successful recovery of the received traffic data being communicated.

Figure 13:
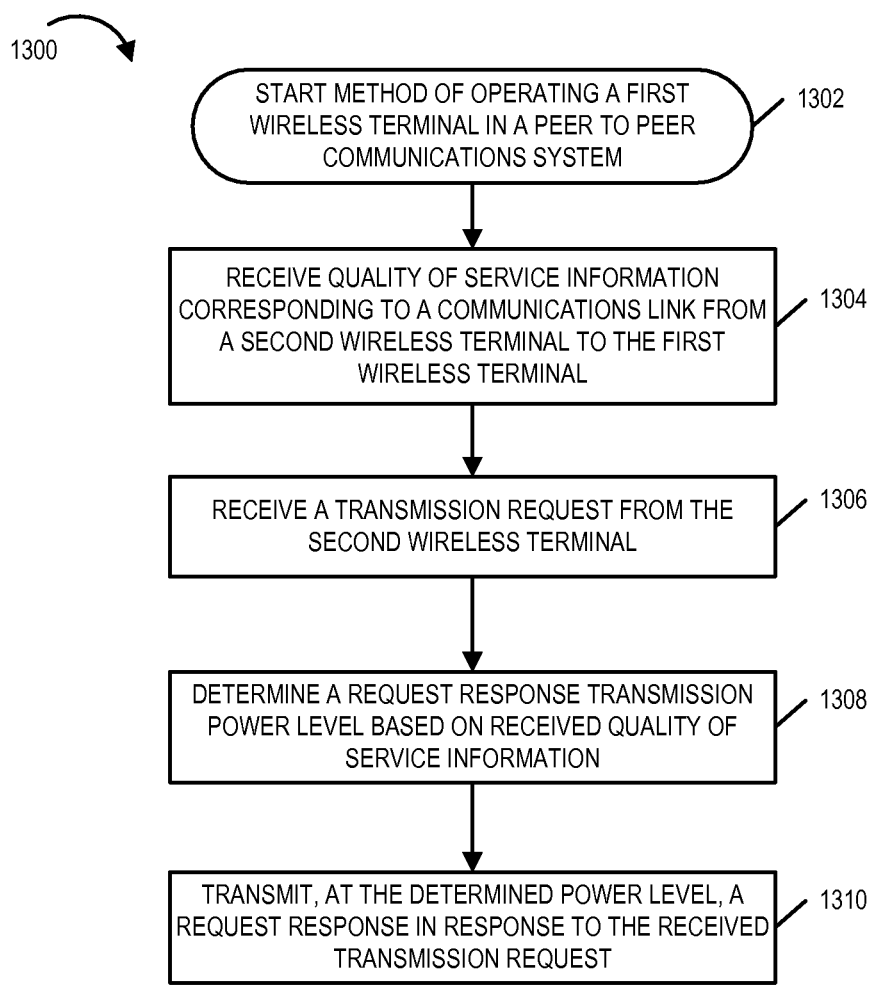
FIG. 13 is a flowchart of an exemplary method of operating a first wireless terminal in a peer to peer communications system.

FIG. 13 is a flowchart 1300 of an exemplary method of operating a first wireless terminal in a peer to peer communications system. Operation of the exemplary method starts in step 1302 where the first wireless terminal is powered on and initialized. Operation proceeds from start step 1302 to step 1304.

In step 1304, the first wireless terminal receives quality of service information corresponding to a communications link from a second wireless terminal to the first wireless terminal.

In some embodiments, the second and first wireless terminals are mobile devices. Operation proceeds from step 1304 to step 1306.

In step 1306 the first wireless terminal receives a transmission request from the second wireless terminal. In some embodiments, the quality of service information and the transmission request are received in separate signals. In some other embodiments, the quality of service information and the transmission request are received in a single signal. In some embodiments, the quality of service information is based on the type of data to be transmitted by the second wireless terminal to the first wireless terminal in a traffic slot corresponding to said transmission request. In some embodiments, the quality of service information is based on the amount of data waiting to be transmitted by the second wireless terminal to the first wireless terminal. Operation proceeds from step 1306 to step 1308.

In step 1308 the first wireless terminal determines a request response transmission power level based on quality of service information. In some embodiments, determining a request response transmission power includes increasing the request response transmission power from a previously determined request response transmission power level when said quality of service information indicates an increase in a quality of service corresponding to the communications link from the second wireless terminal to the first wireless terminal. In some embodiments, determining a request response transmission power includes decreasing the request response transmission power from a previously determined request response transmission power level when said quality of service information indicates a decrease in a quality of service corresponding to the communications link from the second wireless terminal to the first wireless terminal. Determining a request response transmission power level, in some embodiments, includes: determining a minimum request response transmission power level based on the received power of the transmission requests; and decreasing, when the previously determined request response transmission power level and when said quality of service indicates a decrease in a quality of service corresponding to the communications link from the second wireless terminal to the first wireless terminal, the request response transmission power level from a previously determined request response transmission power level.

Operation proceeds from step 1308 to step 1310. In step 1310 the first wireless terminal transmits, at the determined power level, a request response in response to the received transmission request.

Figure 14:
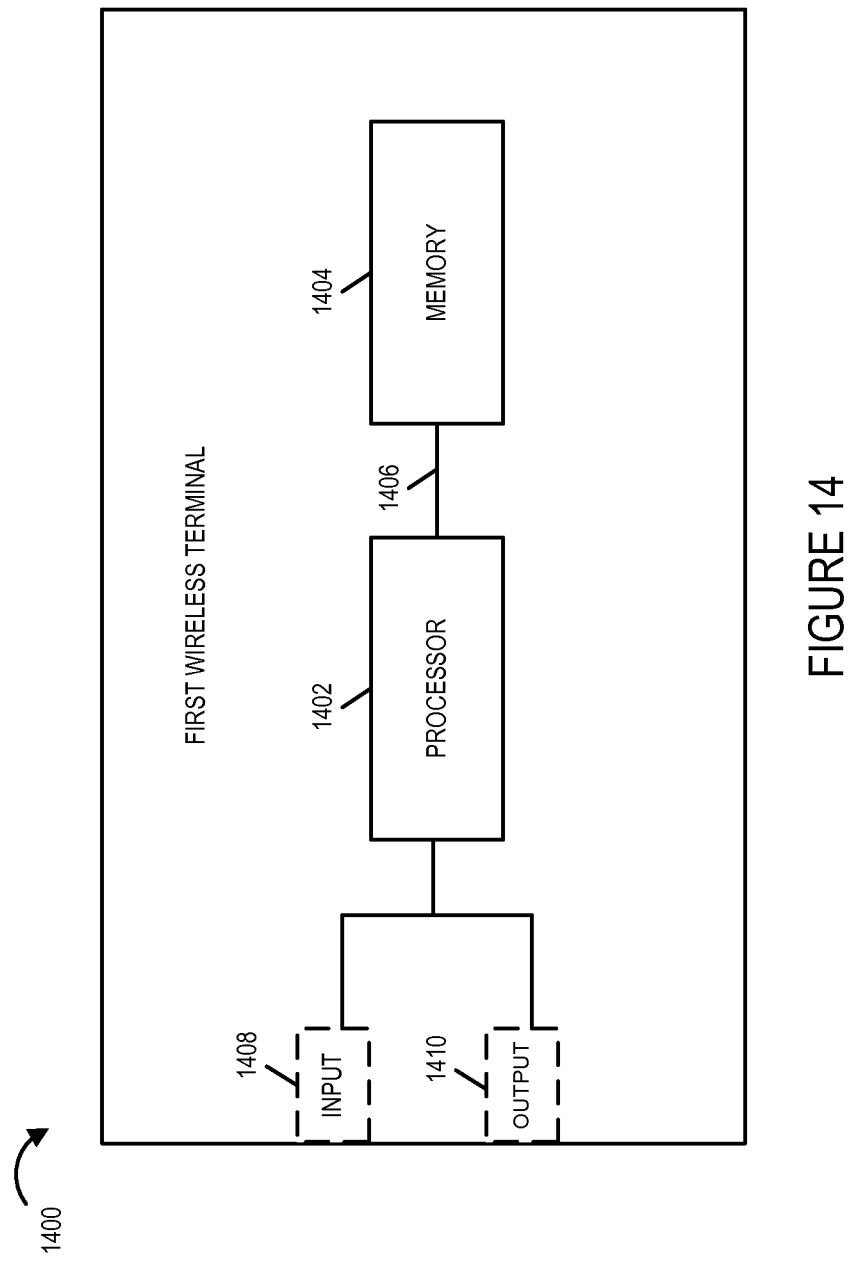
FIG. 14 is a drawing of an exemplary first wireless terminal in accordance with an exemplary embodiment.

FIG. 14 is a drawing of an exemplary first wireless terminal 1400 in accordance with an exemplary embodiment. Exemplary first wireless terminal 1400 is, e.g., a wireless terminal such as a mobile node supporting peer to peer communications and implementing a method in accordance with flowchart 1300 of FIG. 13.

First wireless terminal 1400 includes a processor 1402 and memory 1404 coupled together via a bus 1406 over which the various elements (1402, 1404) may interchange data and information. First wireless terminal 1400 further includes an input module 1408 and an output module 1410 which may be coupled to processor 1402 as shown. However, in some embodiments, the input module 1408 and output module 1410 are located internal to the processor 1402. Input module 1408 can receive input signals. Input module 1408 can, and in some embodiments does, include a wireless receiver and/or a wired or optical input interface for receiving input. Output module 1410 may include, and in some embodiments does include, a wireless transmitter and/or a wired or optical output interface for transmitting output.

Processor 1402 is configured to: receive quality of service information corresponding to a communications link from a second wireless terminal to the first wireless terminal; receive a transmission request from the second wireless terminal; determine a request response transmission power level based on received quality of service information; and transmit, at the determined power level, a request response in response to the received transmission request. In some embodiments, the second and first wireless terminals are mobile devices.

In various embodiments, said quality of service information is based on the type of data to be transmitted by the second wireless terminal to the first wireless terminal in a traffic slot corresponding to said transmission request. In some embodiments, said quality of service information is based on the amount of data waiting to be transmitted by the second wireless terminal to the first wireless terminal.

In some embodiments, said quality of service information and said transmission request are received in separate signals. In some other embodiments, said quality of service information and said transmission request are received in a single signal.

In some embodiments the processor 1402 is configured to increase the request response transmission power level from a previously determined request response transmission power level when said quality of service information indicates an increase in a quality of service corresponding to the communications link from the second wireless terminal to the first wireless terminal, as part of being configured to determine a request response transmission power. In some embodiments the processor 1402 is configured to decrease the request response transmission power level from a previously determined request response transmission power level when said quality of service information indicates a decrease in a quality of service corresponding to the communications link from the second wireless terminal to the first wireless terminal, as part of being configured to determine a request response transmission power. In various embodiments, the processor 1402 is configured to: determine a minimum request response transmission power level based on the received power of the transmission request; and decrease, when the previous determined request response transmission power level exceeds the determined minimum request response transmission power level and when said quality of service information indicates an decrease in a quality of service corresponding to the communications link from the second wireless terminal to the first wireless terminal, the request response transmission power level from a previously determined request response transmission power level, as part of being configured to determine a request response transmission power.

Figure 15:
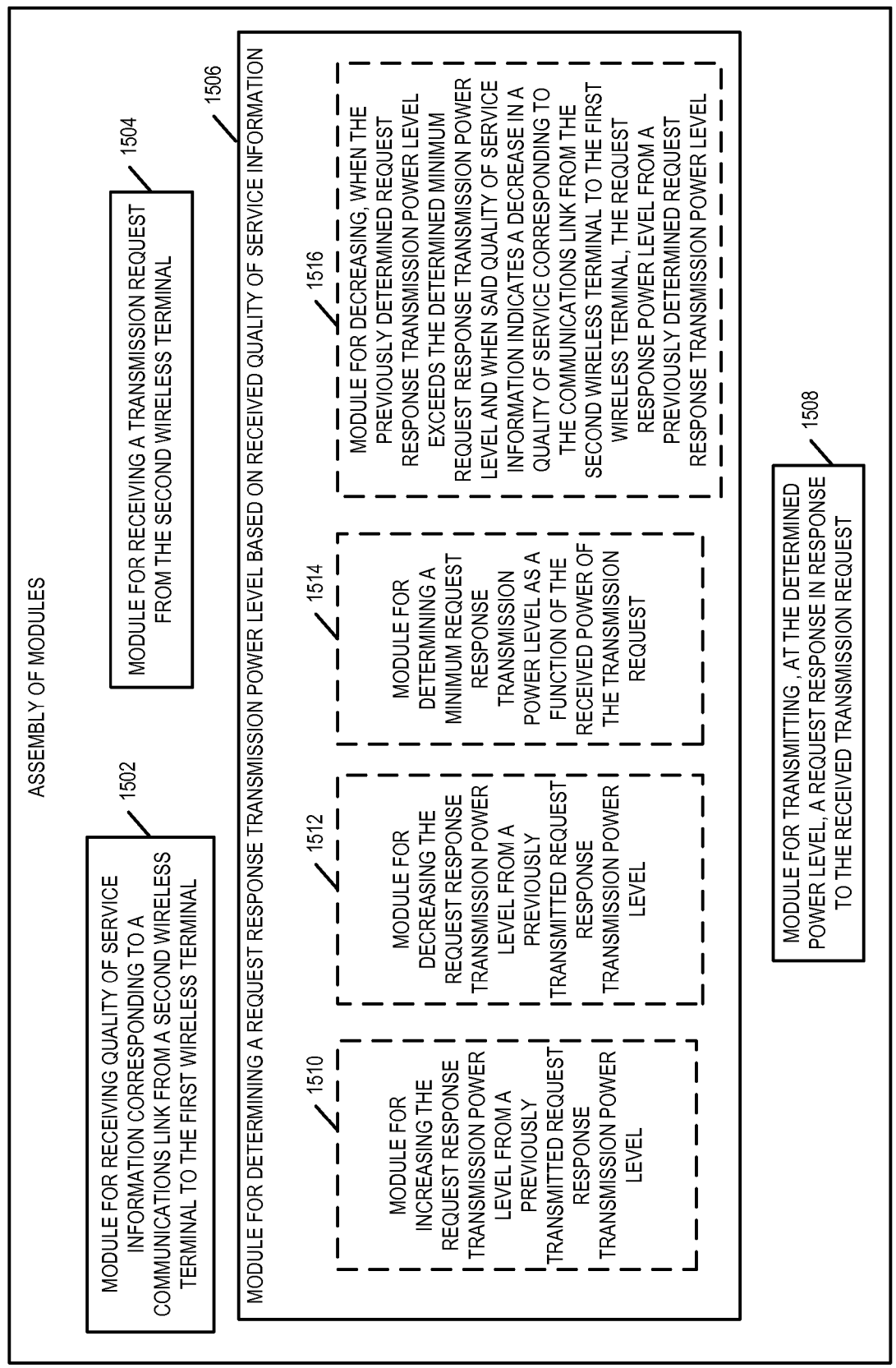
FIG. 15 is an assembly of modules which can, and in some embodiments are, used in the first wireless terminal illustrated in FIG. 14.

FIG. 15 is an assembly of modules 1500 which can, and in some embodiments are, used in the first wireless terminal 1400 illustrated in FIG. 14. The modules in the assembly 1500 can be implemented in hardware within the processor 1402 of FIG. 14, e.g., as individual circuits. Alternatively, the modules may be implemented in software and stored in the memory 1404 of the first wireless terminal 1400 shown in FIG. 14. While shown in the FIG. 14 embodiment as a single processor, e.g., computer, it should be appreciated that the processor 1402 may be implemented as one or more processors, e.g., computers. When implemented in software the modules include code, which when executed by the processor, configure the processor, e.g., computer, 1402 to implement the function corresponding to the module. In embodiments where the assembly of modules 1400 is stored in the memory 1404, the memory 1404 is a computer program product comprising a computer readable medium comprising code, e.g., individual code for each module, for causing at least one computer, e.g., processor 1402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 15 control and/or configure the first wireless terminal 1400 or elements therein such as the processor 1402, to perform the functions of the corresponding steps illustrated in the method flowchart 1300 of FIG. 13.

As illustrated in FIG. 15, the assembly of modules 1500 includes: a module 1502 for receiving quality of service information corresponding to a communications link from a second wireless terminal to the first wireless terminal; a module 1504 for receiving a transmission request from the second wireless terminal; a module 1506 for determining a request response transmission power level based on received quality of service information; and a module 1508 for transmitting, at the determined power level, a request response in response to the received transmission request. In some embodiments, said second and first wireless terminals are mobile devices.

The quality of service information, in some embodiments, is based on the type of data to be transmitted by the second wireless terminal to the first wireless terminal in a traffic slot corresponding to said transmission request. The quality of service information, in some embodiments, is based on the amount of data waiting to be transmitted by the second wireless terminal to the first wireless terminal.

The quality of service information and said transmission request are, in some embodiments, received in separate signals. In some other embodiments, the quality of service information and said transmission request are received in a single signal.

In some embodiments, module 1506 for determining a request response transmission power level based on received quality of service information includes one or more of modules 1510, 1512, 1514 and 1516. Module 1510 is a module for increasing the request response transmission power level from a previously determined request response transmission power level when said quality of service information indicates an increase in a quality of service corresponding to the communications link from the second wireless terminal to the first wireless terminal. Module 1512 is a module for decreasing the request response transmission power level from a previously determined request response transmission power level when said quality of service information indicates a decrease in a quality of service corresponding to the communications link from the second wireless terminal to the first wireless terminal. Module 1514 is a module for determining a minimum request response transmission power level based on the received power of the transmission request; module 1516 is a module for decreasing, when the previous determined request response transmission power level exceeds the determined minimum request response transmission power level and when said quality of service information indicates an decrease in a quality of service corresponding to the communications link from the second wireless terminal to the first wireless terminal, the request response transmission power level from a previously determined request response transmission power level.

Figure 16:
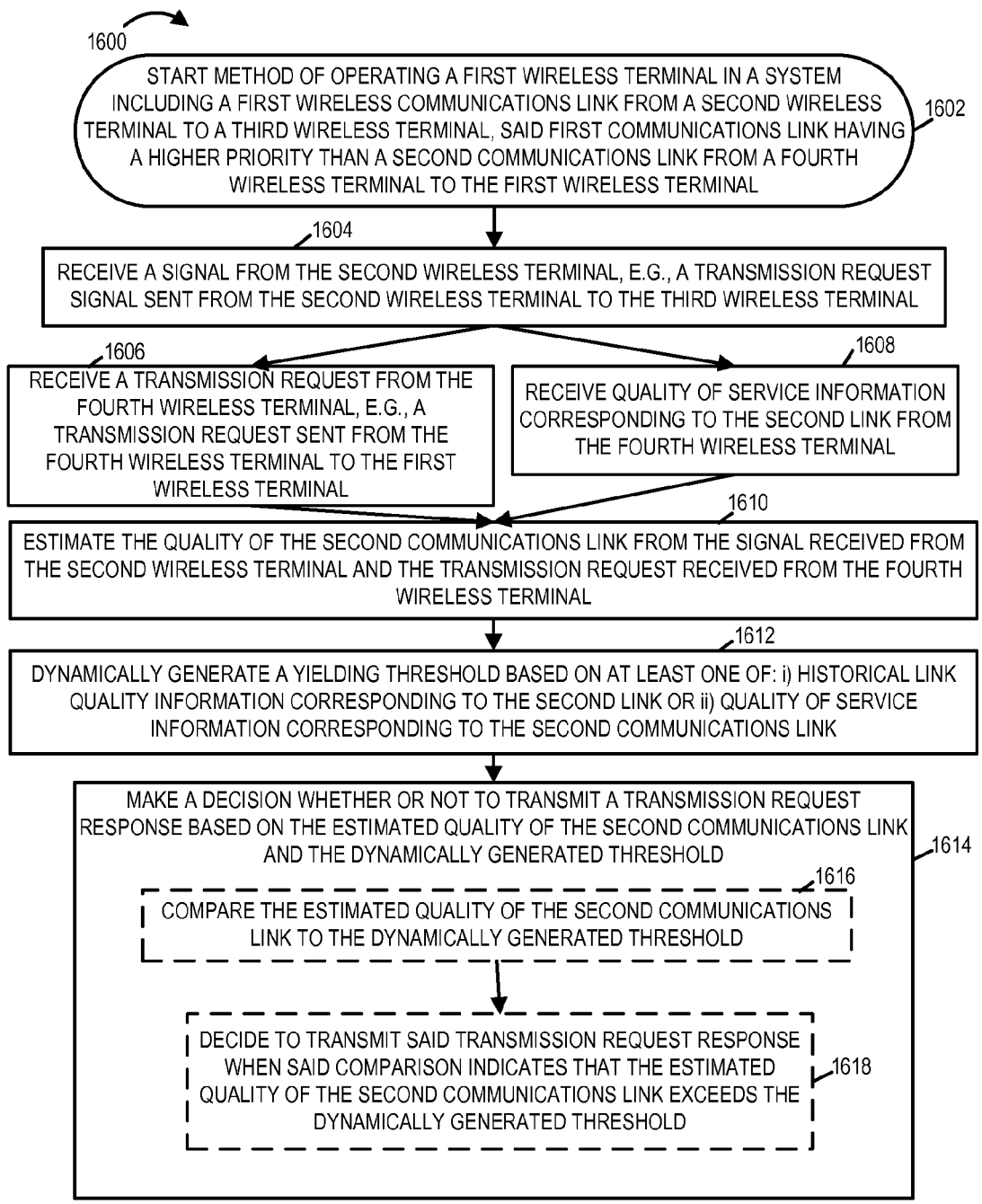
FIG. 16 is a flowchart of an exemplary method of operating a first wireless terminal in a peer to peer communications system.

FIG. 16 is a flowchart 1600 of an exemplary method of operating a first wireless terminal in a system including a first wireless communications link from a second wireless terminal to a third wireless terminal, said first communications link having a higher priority than a second communications link from a fourth wireless terminal to the first wireless terminal. In some embodiments, the system is a peer to peer wireless communication system. Operation of the exemplary method starts in step 1602 where the first wireless terminal is powered on and initialized and proceeds to step 1604.

In step 1604 the first wireless terminal receives a signal from the second wireless terminal, e.g., a transmission request signal send from the second wireless terminal to the third wireless terminal. Operation proceeds from step 1604 to steps 1606 and 1608.

In step 1606 the first wireless terminal receives a transmission request from the fourth wireless terminal, e.g., a transmission request sent from the fourth wireless terminal to the first wireless terminal. In step 1608 the first wireless terminal receives quality of service information corresponding to the second link from the fourth wireless terminal. The quality of service information, in some embodiments, is based on the amount of data waiting to be transmitted by the fourth wireless terminal to the first wireless terminal. In some embodiments, the quality of service information indicates a quality of service level corresponding to a type of traffic waiting at said fourth wireless terminal to be transmitted. Operation proceeds from step 1606 and step 1608 to step 1610.

In step 1610 the first wireless terminal estimates the quality of the second communications link from the signal received from the second wireless terminal and the transmission request received from the fourth wireless terminal. In some embodiments, the estimated quality of the second communications link is based on a current communications rate supported by the second communications link. In various embodiments, the estimated quality of the second communications link is based on a current signal to noise ratio of the second communication link. Operation proceeds from step 1610 to step 1612.

In step 1612 the first wireless terminal dynamically generates a yielding threshold based on at least one of: i) historical link quality information corresponding to the second link or ii) quality of service information corresponding to the second communications link. In some embodiments, dynamically generating said threshold includes generating a lower threshold than a previous threshold when the quality of service information indicates an increase in a quality of service level corresponding to the second communications link. In some embodiments, dynamically generating said threshold includes generating a higher threshold than a previous threshold when the quality of service information indicates a decrease in a quality of service level corresponding to the second communications link. In various embodiments, the historical link quality information includes an average data rate supported by the second communications link during a previous time interval. Operation proceeds from step 1612 to step 1614.

In step 1614, the first wireless terminal makes a decision whether or not to transmit a transmission request response based on the estimated quality of second communications link and the dynamically generated threshold. In some embodiments, step 1614 includes one or more of sub-steps 1616 and 1618. In sub-step 1616 the first wireless terminal compares the estimated quality of the second communications link to the dynamically generated threshold. In sub-step 1618 the first wireless terminal decides to transmit said transmission request response when said comparison indicates that the estimated quality of the second communications link exceeds the dynamically generated threshold.

Figure 17:
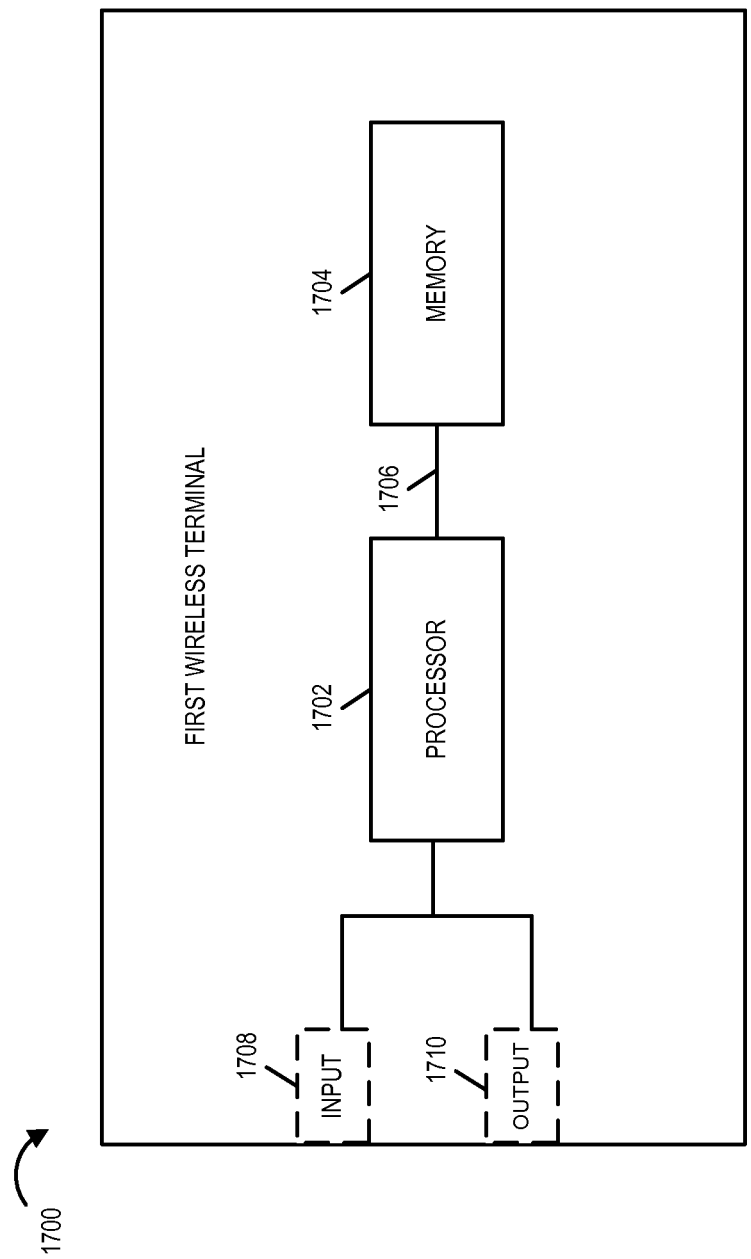
FIG. 17 is a drawing of an exemplary first wireless terminal in accordance with an exemplary embodiment.

FIG. 17 is a drawing of an exemplary first wireless terminal 1700 in accordance with an exemplary embodiment. Exemplary first wireless terminal 1700 is, e.g., a wireless terminal such as a mobile node supporting peer to peer communications and implementing a method in accordance with flowchart 1600 of FIG. 16. First wireless terminal 1700 is, e.g., a first wireless terminal in a system including a first wireless communications link from a second wireless terminal to a third wireless terminal, said first communications link having a higher priority than a second communications link from a fourth wireless terminal to the first wireless terminal.

First wireless terminal 1700 includes a processor 1702 and memory 1704 coupled together via a bus 1706 over which the various elements (1702, 1704) may interchange data and information. First wireless terminal 1700 further includes an input module 1708 and an output module 1710 which may be coupled to processor 1702 as shown. However, in some embodiments, the input module 1708 and output module 1710 are located internal to the processor 1702. Input module 1708 can receive input signals. Input module 1708 can, and in some embodiments does, include a wireless receiver and/or a wired or optical input interface for receiving input. Output module 1710 may include, and in some embodiments does include, a wireless transmitter and/or a wired or optical output interface for transmitting output.

Processor 1702 is configured to: receive a signal from the second wireless terminal; receive a transmission request from the fourth wireless terminal; estimate the quality of the second communications link from the signal received from the second wireless terminal and the transmission request received from the fourth wireless terminal; and dynamically generate a yielding threshold based on at least one of: i) historic link quality information corresponding to the second link; or ii) quality of service information corresponding to the second communications link. In some embodiments, the received signal from the second wireless terminal is a transmission request signal sent from the second wireless terminal to the third wireless terminal. The historic link quality information, in some embodiments, includes an average data rate supported by the second communications link during a previous time interval.

The estimated quality of the second communications link, in some embodiments, is based on a current communications rate supported by the second communications link. The estimated quality of the second communications link, in various embodiments, is based on a current signal to noise ratio of the second communications link.

Processor 1702, in some embodiments, is configured to generate a lower threshold than a previous threshold when the quality of service information indicates an increase in a quality of service level corresponding to the second communications link, as part of being configured to dynamically generate said threshold. In some embodiments, processor 1702 is configured to generate a higher threshold than a previous threshold when the quality of service information indicates a decrease in a quality of service level corresponding to the second communications link, as part of being configured to dynamically generate said threshold.

The processor 1702, in some embodiments, is further configured to: receive the quality of service information corresponding to the second link from the fourth wireless terminal. In some embodiments, quality of service information is based on the amount of data waiting to be transmitted by the fourth wireless terminal to the first wireless terminal. In various embodiments, the quality of service information indicates a quality of service level corresponding to a type of traffic waiting at said fourth wireless terminal to be transmitted.

Processor 1702 is also configured to make a decision whether or not to transmit a transmission request response based on the estimated quality of the second communications link and the dynamically generated threshold. In some embodiments, processor 1702 is configured to: compare the estimated quality of the second communications link to the dynamically generated threshold; and decide to transmit said transmission request response when said comparison indicates that the estimated quality of the second communications link exceeds the dynamically generated threshold, as part of being configured to make a decision.

Figure 18:
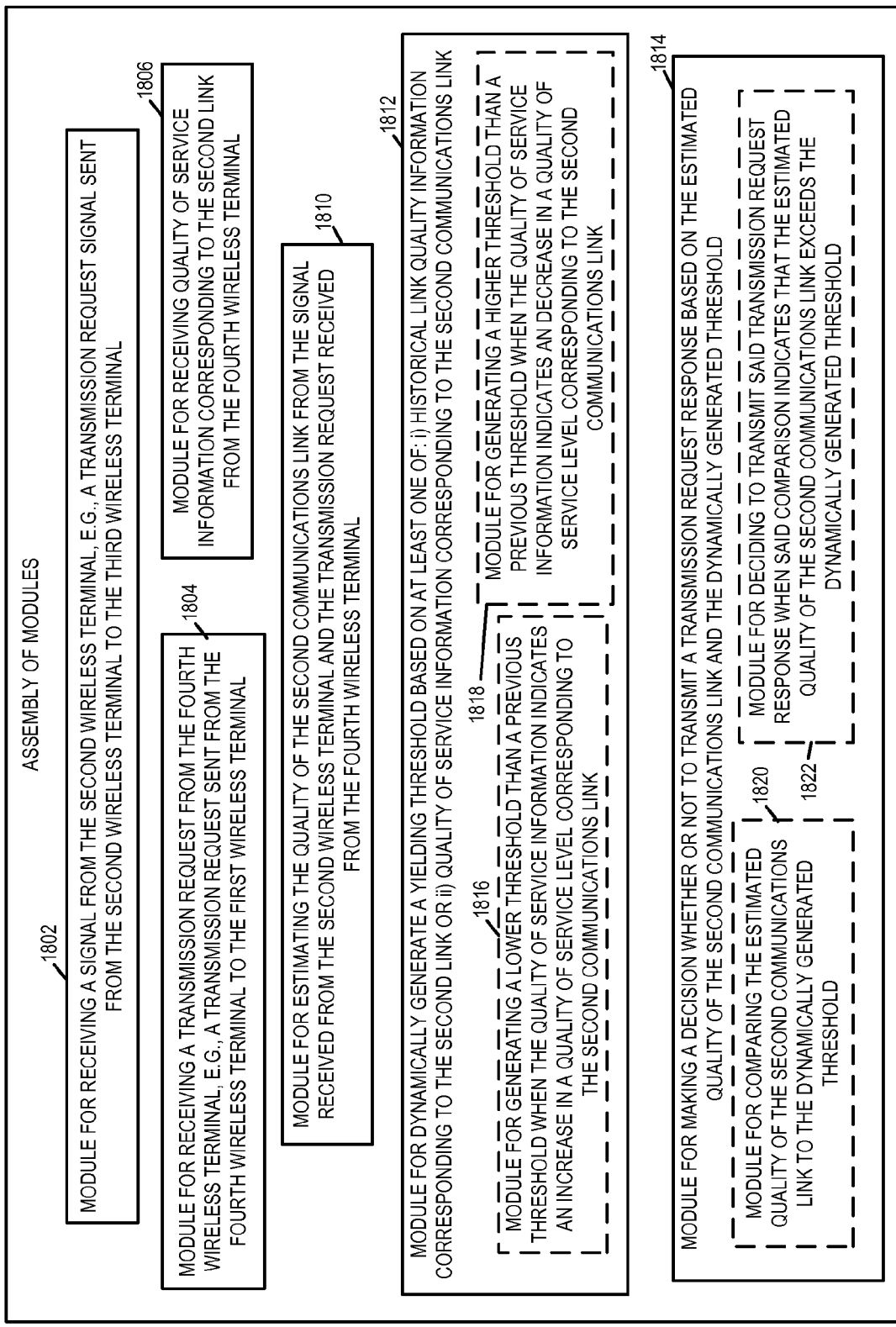
FIG. 18 is an assembly of modules which can, and in some embodiments are, used in the first wireless terminal illustrated in FIG. 17.

FIG. 18 is an assembly of modules 1800 which can, and in some embodiments are, used in the first wireless terminal 1700 illustrated in FIG. 17. The modules in the assembly 1800 can be implemented in hardware within the processor 1702 of FIG. 17, e.g., as individual circuits. Alternatively, the modules may be implemented in software and stored in the memory 1704 of the first wireless terminal 1700 shown in FIG. 17. While shown in the FIG. 17 embodiment as a single processor, e.g., computer, it should be appreciated that the processor 1702 may be implemented as one or more processors, e.g., computers. When implemented in software the modules include code, which when executed by the processor, configure the processor, e.g., computer, 1702 to implement the function corresponding to the module. In embodiments where the assembly of modules 1800 is stored in the memory 1704, the memory 1704 is a computer program product comprising a computer readable medium comprising code, e.g., individual code for each module, for causing at least one computer, e.g., processor 1702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 18 control and/or configure the first wireless terminal 1700 or elements therein such as the processor 1702, to perform the functions of the corresponding steps illustrated in the method flowchart 1600 of FIG. 16.

As illustrated in FIG. 18, the assembly of modules 1800 includes: a module 1802 for receiving a signal from the second wireless terminal; a module 1804 for receiving a transmission request from the fourth wireless terminal; a module 1810 for estimating the quality of the second communications link from the signal received from the second wireless terminal and the transmission request received from the fourth wireless terminal; and a module 1812 for dynamically generating a yielding threshold based on at least one of: i) historic link quality information corresponding to the second link; or ii) quality of service information corresponding to the second communications link. In some embodiments, the received signal from the second wireless terminal is a transmission request signal sent from the second wireless terminal to the third wireless terminal. The historical link quality information, in some embodiments, includes an average data rate supported by the second communications link during a previous time interval.

In some embodiments, the estimated quality of the second communications link is based on a current communications rate supported by the second communications link. In various embodiments, the estimated quality of the second communications link is based on a current signal to noise ratio of the second communications link.

In some embodiments, the module 1812 for dynamically generating said threshold includes a module 1816 for generating a lower threshold than a previous threshold when the quality of service information indicates an increase in a quality of service level corresponding to the second communications link. In various embodiments, the module 1812 for dynamically generating said threshold includes a module 1818 for generating a higher threshold than a previous threshold when the quality of service information indicates a decrease in a quality of service level corresponding to the second communications link.

Assembly of modules 1800 further includes: a module 1806 for receiving the quality of service information corresponding to the second link from the fourth wireless terminal; and a module 1814 making a decision whether or not to transmit a transmission request response based on the estimated quality of the second communications link and the dynamically generated threshold. The quality of service information, in some embodiments, is based on the amount of data waiting to be transmitted by the fourth wireless terminal to the first wireless terminal. The quality of service information, in some embodiments, indicates a quality of service level corresponding to a type of traffic waiting at said fourth wireless terminal to be transmitted.

In various embodiments, the module 1814 for making the decision includes one or more of module 1820 for comparing the estimated quality of the second communications link to the dynamically generated threshold; and module 1822 for deciding to transmit said transmission request response when said comparison indicates that the estimated quality of the second communications link exceeds the dynamically generated threshold.

Figure 19:
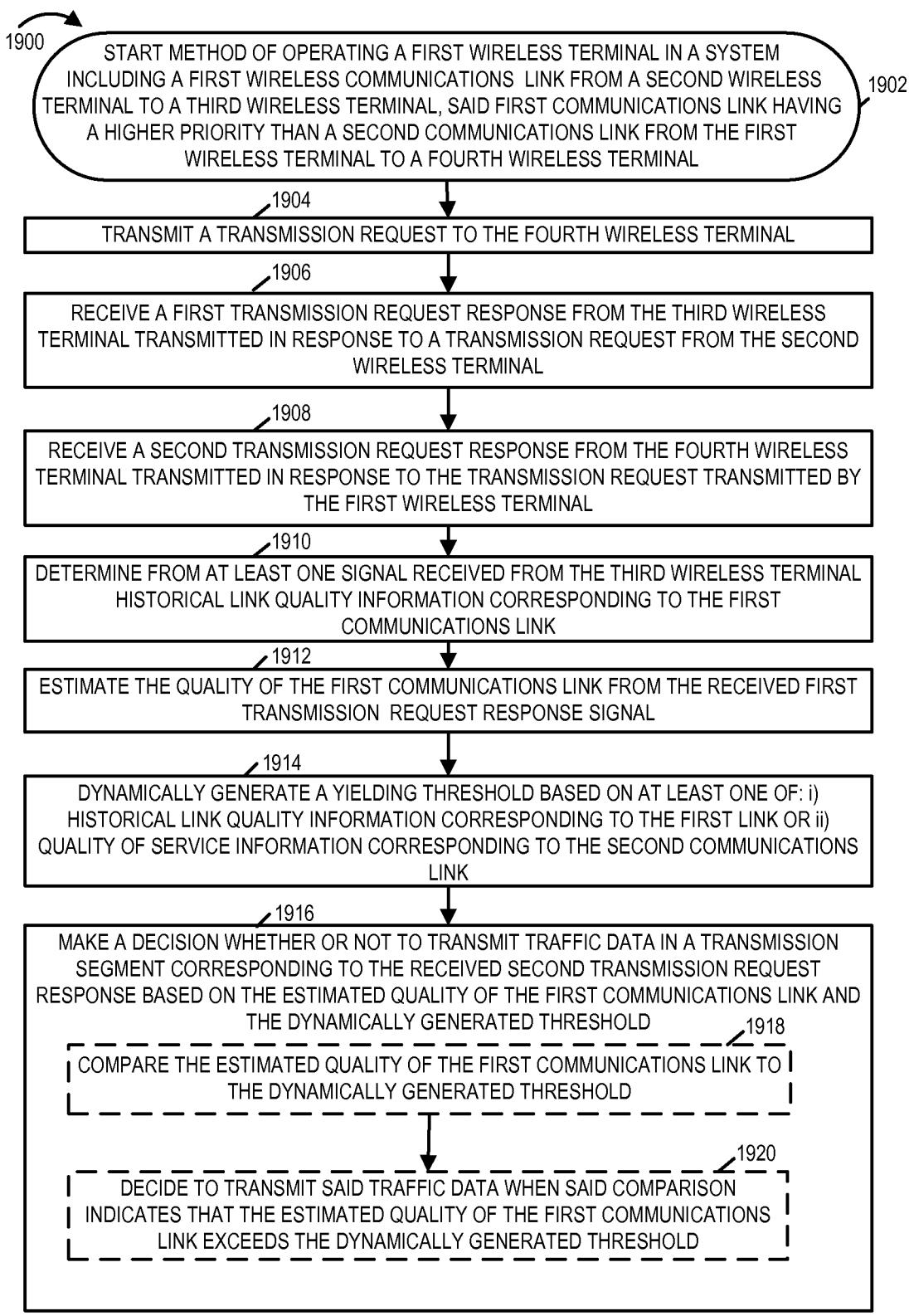
FIG. 19 is a flowchart of an exemplary method of operating a first wireless terminal in a peer to peer communications system.

FIG. 19 is a flowchart 1900 of an exemplary method of operating a first wireless terminal in a system including a first wireless communications link from a second wireless terminal to a third wireless terminal, said first communications link having a higher priority than a second communications link from the first wireless terminal to a fourth wireless terminal. In some embodiments, the system is a peer to peer wireless communication system. In some embodiments, the first and fourth wireless terminals are mobile communications devices. Operation of the exemplary method starts in step 1902 where the first wireless terminal is powered on and initialized and proceeds to step 1904.

In step 1904, the first wireless terminal transmits a transmission request to the fourth wireless terminal. Operation proceeds from step 1904 to step 1906.

In step 1906 the first wireless terminal receives a first transmission request response from the third wireless terminal transmitted in response to a transmission request from the second wireless terminal. Operation proceeds from step 1906 to step 1908.

In step 1908 the first wireless terminal receives a second transmission request response from the fourth wireless terminal transmitted in response to the transmission request transmitted by the first wireless terminal. Operation proceeds from step 1908 to step 1910.

In step 1910 the first wireless terminal determines from at least one signal received from the third wireless terminal historical link quality information corresponding to the first communications link. In some embodiments, the at least one signal is a broadcast signal from the third wireless terminal, which communicates historical rate information. In various embodiments, determining from at least one signal received from the third wireless terminal historical link quality information corresponding to the first communications link includes accumulating link quality information from multiple signals sent from the third wireless terminal to the second wireless terminal, each of said multiple signals communicating link quality information corresponding to a different period of time. In some such embodiments, the link quality information includes at least one of link SNR information or rate information. Operation proceeds from step 1910 to step 1912.

In step 1912 the first wireless terminal estimates the quality of the first communications link from the received first transmission request response signal. In some embodiments, estimating the quality of the first communications link includes using a determined intended second link traffic signaling transmission power level. In various embodiments, estimating the quality of first communications link is performed based on the received second transmission request response signal. Operation proceeds from step 1912 to step 1914.

In step 1914 the first wireless terminal dynamically generates a yielding threshold based on at least one of: i) historical link quality information corresponding to the first link or ii) quality of service information corresponding to the second communications link. The quality of service information, in some embodiments is based on the amount of data waiting to be transmitted by the first wireless terminal to the fourth wireless terminal. The historical link quality information, in some embodiments, includes an average data rate supported by the first communications link during a previous time interval. The quality of service information, in some embodiments, indicates a quality of service level corresponding to a type of traffic waiting at the first wireless terminal to be transmitted. In some embodiments, dynamically generating said threshold includes generating a lower threshold than a previous threshold when the quality of service information indicates an increase in a quality of service level corresponding to the second communications link. In various embodiments, dynamically generating said threshold includes generating a higher threshold than a previous threshold when the quality of service information indicates a decrease in a quality of service level corresponding to the second communications link. Operation proceeds from step 1914 to step 1916.

In step 1916 the first wireless terminal makes a decision whether or not to transmit traffic data in a transmission segment corresponding to the received second transmission request response based on the estimated quality of the first communications link and the dynamically generated threshold. In some embodiments, step 1916 includes one or more of sub-steps 1918 and 1920. In sub-step 1918 the first wireless terminal compares the estimated quality of the first communications link to the dynamically generated threshold and in sub-step 1920 the first wireless terminal decides to transmit traffic data when said comparison indicates that the estimated quality of the first communications link exceeds the dynamically generated threshold.

Figure 20:
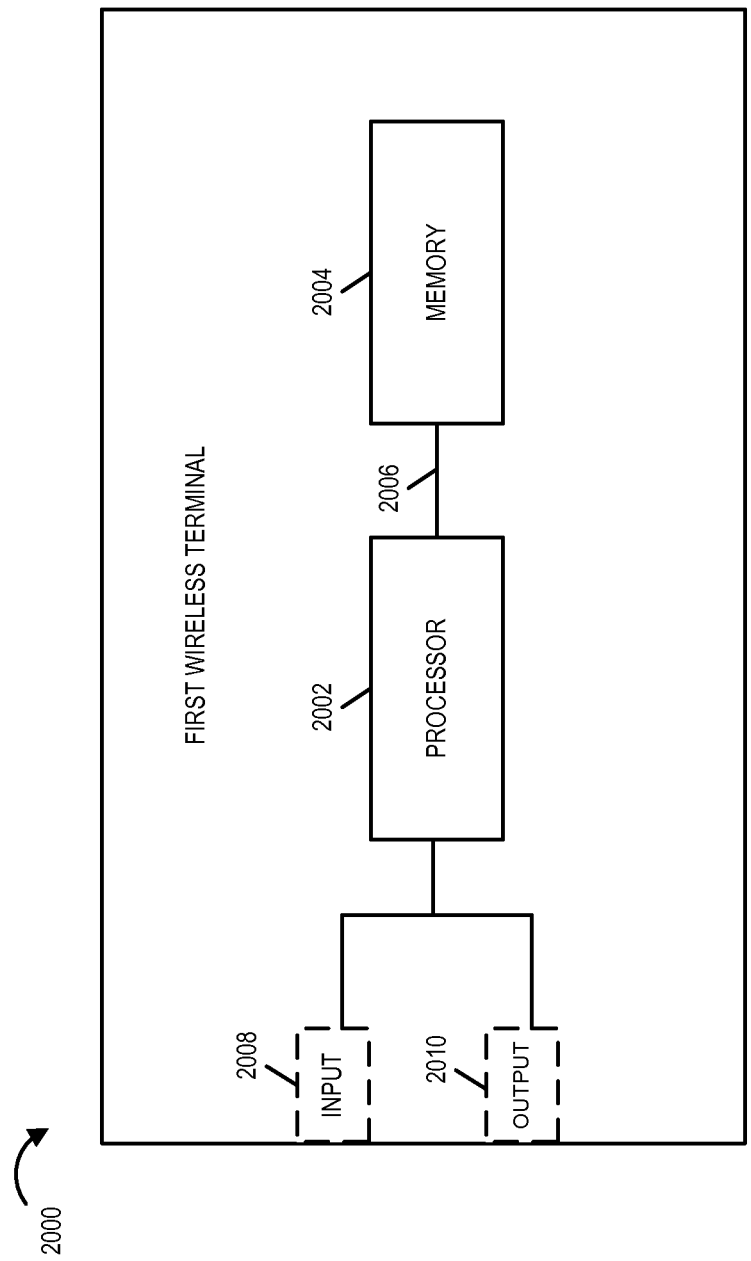
FIG. 20 is a drawing of an exemplary first wireless terminal in accordance with an exemplary embodiment.

FIG. 20 is a drawing of an exemplary first wireless terminal 2000 in accordance with an exemplary embodiment. Exemplary first wireless terminal 2000 is, e.g., a wireless terminal such as a mobile node supporting peer to peer communications and implementing a method in accordance with flowchart 1900 of FIG. 19. First wireless terminal 1900 is, e.g., a first wireless terminal in a system including a first wireless communications link from a second wireless terminal to a third wireless terminal, said first communications link having a higher priority than a second communications link from the first wireless terminal to a fourth wireless terminal. In some embodiments, the first and fourth wireless terminals are mobile communications devices.

First wireless terminal 2000 includes a processor 2002 and memory 2004 coupled together via a bus 2006 over which the various elements (2002, 2004) may interchange data and information. First wireless terminal 2000 further includes an input module 2008 and an output module 2010 which may be coupled to processor 2002 as shown. However, in some embodiments, the input module 2008 and output module 2010 are located internal to the processor 2002. Input module 2008 can receive input signals. Input module 2008 can, and in some embodiments does, include a wireless receiver and/or a wired or optical input interface for receiving input. Output module 2010 may include, and in some embodiments does include, a wireless transmitter and/or a wired or optical output interface for transmitting output.

Processor 2002 is configured to: transmit a transmission request to the fourth wireless terminal; receive a first transmission request response from the third wireless terminal transmitted in response to a transmission request from the second wireless terminal; and receive a second transmission request response from the fourth wireless terminal. Processor 2002 is further configured to estimate the quality of the first communications link from the received first transmission request response signal; and dynamically generate a yielding threshold based on at least one of: i) historic link quality information corresponding to the first link; or ii) quality of service information corresponding to the second communications link.

Processor 2002, in some embodiments, is configured to use a determined intended second link traffic signaling transmission power level as part of being configured to estimate the quality of the first communications link. In various embodiments, processor 2002 is configured to use the received second transmission request response signal as part of being configured to estimate the quality of the first communications link.

Processor 2002 is further configured to determine from at least one signal received from the third wireless terminal historical link quality information corresponding to the first communications link. The at least on signal, in some embodiments, is a broadcast signal from the third wireless terminal which communicates said historical rate information. The historic link quality information, in some embodiments, includes an average data rate supported by the first communications link during a previous time interval.

In various embodiments, processor 2002 is further configured to accumulate link quality information from multiple signals sent from the third wireless terminal to the second wireless terminal, each of said multiple signals communicating link quality information corresponding to a different period of time, as part of being configured to determine from at least one signal received from the third wireless terminal historical link quality information corresponding to the first communications link. The link quality information, in some embodiments, includes at least one of link SNR information or rate information.

Processor 2002 is further configured to make a decision whether or not to transmit traffic data in a transmission segment corresponding to the received second transmission request response based on the estimated quality of the first communications link and the dynamically generated threshold. Processor 2002, in some embodiments, is configured to: compare the estimated quality of the first communications link to the dynamically generated threshold; and decide to transmit said traffic data when said comparison indicates that the estimated quality of the first communications link exceeds the dynamically generated threshold, as part of being configured to make said decision.

Quality of service information can be, and sometimes is, based on the amount of data waiting to be transmitted by the first wireless terminal to the fourth wireless terminal. Quality of service information can, and sometimes does, indicates a quality of service level corresponding to a type of traffic waiting at said first wireless terminal to be transmitted.

Processor 2002, in some embodiments, is configured to generate a lower threshold than a previous threshold when the quality of service information indicates an increase in a quality of service level corresponding to the second communications link, as part of being configured to dynamically generate said threshold. Processor 2002, in various embodiments, is configured to generate a higher threshold than a previous threshold when the quality of service information indicates a decrease in a quality of service level corresponding to the second communications link, as part of being configured to dynamically generate said threshold.

Figure 21:
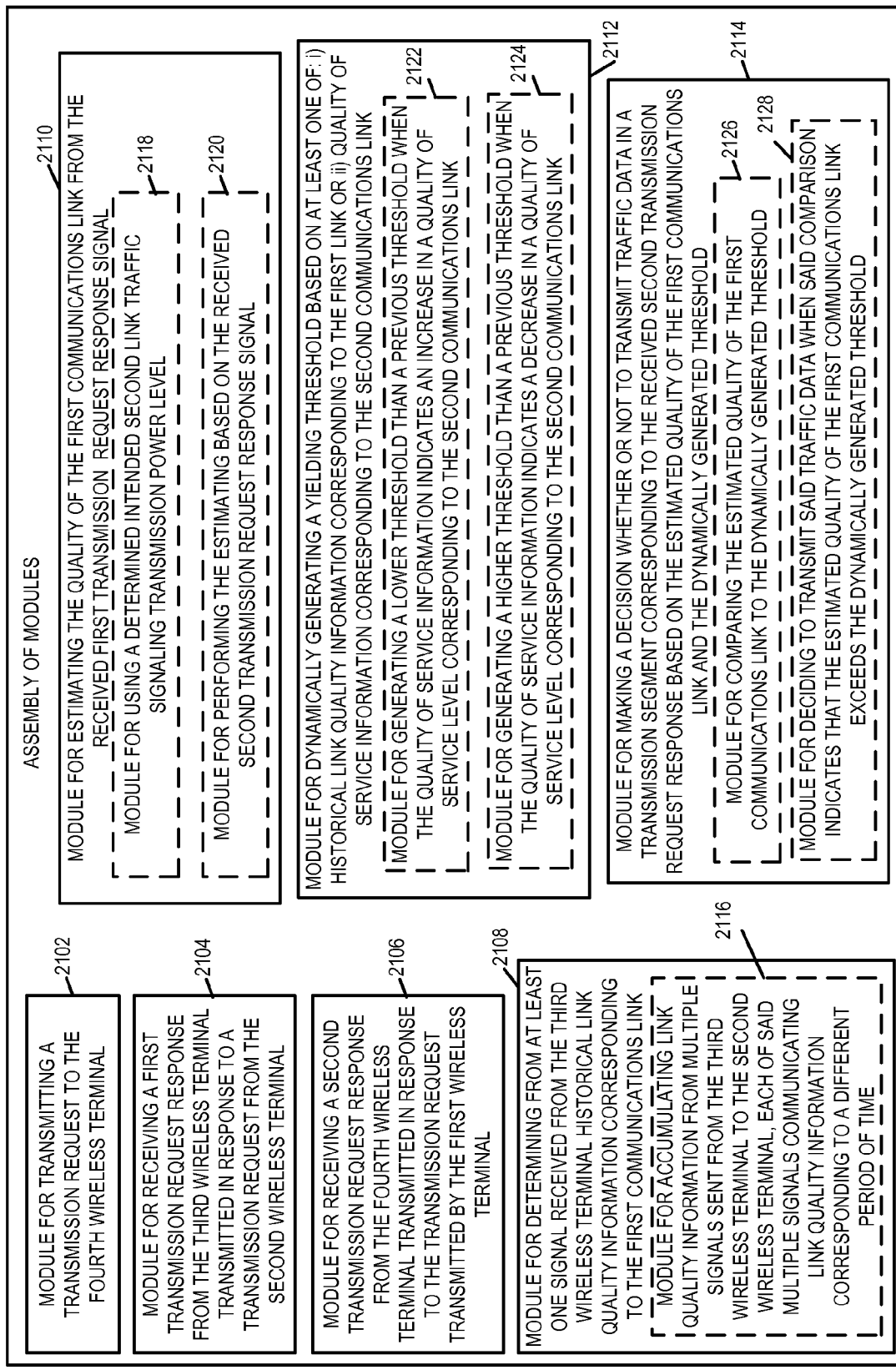
FIG. 21 is an assembly of modules which can, and in some embodiments are, used in the first wireless terminal illustrated in FIG. 20.

FIG. 21 is an assembly of modules 2100 which can, and in some embodiments are, used in the first wireless terminal 2000 illustrated in FIG. 20. The modules in the assembly 2100 can be implemented in hardware within the processor 2002 of FIG. 20, e.g., as individual circuits. Alternatively, the modules may be implemented in software and stored in the memory 2004 of the first wireless terminal 2000 shown in FIG. 20. While shown in the FIG. 20 embodiment as a single processor, e.g., computer, it should be appreciated that the processor 2002 may be implemented as one or more processors, e.g., computers. When implemented in software the modules include code, which when executed by the processor, configure the processor, e.g., computer, 2002 to implement the function corresponding to the module. In embodiments where the assembly of modules 2100 is stored in the memory 2104, the memory 2104 is a computer program product comprising a computer readable medium comprising code, e.g., individual code for each module, for causing at least one computer, e.g., processor 2102, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 21 control and/or configure the first wireless terminal 2000 or elements therein such as the processor 2002, to perform the functions of the corresponding steps illustrated in the method flowchart 1900 of FIG. 19.

As illustrated in FIG. 21, the assembly of modules 2100 includes: a module 2102 for transmitting a transmission request to the fourth wireless terminal; a module 2104 for receiving a first transmission request response from the third wireless terminal transmitted in response to a transmission request from the second wireless terminal; and a module 2106 for receiving a second transmission request response from the fourth wireless terminal transmitted in response to the transmission request transmitted by the first wireless terminal.

Assembly of modules 2100 further includes: a module 2108 for determining from at least one signal from the third wireless terminal historical link quality information corresponding to the first communications link; a module 2110 for estimating the quality of the first communications link from the received first transmission request response signal; a module 2112 for dynamically generating a yielding threshold based on at least one of: i) historical link quality information corresponding to the first link or ii) quality of service information corresponding to the second communications link; and module 2114 for making a decision whether or not to transmit traffic in a data transmission segment corresponding to the received second transmission request response based on the estimated quality of the first communications link and the dynamically generated threshold.

In some embodiments, the at least one signal is a broadcast signal from the third wireless terminal which communicates historical rate information. In various embodiments, the historical link quality information includes an average data rate supported by the first communications link during a previous time interval.

Module 2108, in some embodiments, includes a module 2116 for accumulating link quality information from multiple signals sent from the third wireless terminal to the second wireless terminal, each of said multiple signals communicating link quality information corresponding to a different period of time. In some embodiments, the link quality information includes at least one of link SNR information or rate information.

Module 2110, in some embodiments, includes one of more of: module 2118 for using a determined intended second link signaling transmission power level in estimating the quality of the first communications link; and module 2120 for performing the estimating based on the received second transmission request response signal.

Module 2112, in some embodiments, includes one or more of: module 2122 for generating a lower threshold than a previous threshold when the quality of service information indicates an increase in a quality of service level corresponding to the second communication link and module 2124 for generating a higher threshold than a previous threshold when the quality of service information indicates a decrease in a quality of service level corresponding to the second communication link. In some embodiments, the quality of service information is based on the amount of data waiting to be transmitted by the first wireless terminal to the fourth wireless terminal. In various embodiments, the quality of service information indicates a quality of service level corresponding to a type of traffic data waiting at said first wireless terminal to be transmitted, e.g., waiting to be transmitted by the first wireless terminal to the fourth wireless terminal.

Module 2114, in some embodiments, includes one or more of: module 2126 for comparing the estimated quality of the first communications link to the dynamically generated threshold; and module 2128 for deciding to transmit said traffic data when said comparison indicates that the estimated quality of the first communications link exceeds the dynamically generated threshold.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving a signal from a second wireless terminal; receiving a transmission request from a fourth wireless terminal; estimating the quality of the second communications link from the signal received from a second wireless terminal and the transmission request received from the fourth wireless terminal; and dynamically generating a yielding threshold based on at least one of: i) historic link quality information corresponding to the second link; or ii) quality of service information corresponding to the second communications link, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless terminal in a system including a first wireless communications link from a second wireless terminal to a third wireless terminal, said first communications link having a higher priority than a second communications link from a fourth wireless terminal to said first wireless terminal, the method comprising:
receiving a signal from the second wireless terminal;
receiving a transmission request from the fourth wireless terminal, the transmission request indicating an intent of the fourth wireless terminal to transmit data to the first wireless terminal;
estimating the quality of the second communications link from the signal received from the second wireless terminal and the transmission request received from the fourth wireless terminal;
dynamically generating a yielding threshold based on at least one of: i) historic link quality information corresponding to the second communications link; or ii) quality of service information corresponding to the second communications link; and
yielding when the estimated quality of the second communications link does not exceed the dynamically generated yielding threshold, wherein the yielding comprises a decision to not have the fourth wireless terminal transmit the data to the first wireless terminal.

2. The method of claim 1, wherein the received signal from the second wireless terminal is a transmission request signal sent from the second wireless terminal to the third wireless terminal.

3. The method of claim 1, further comprising:
receiving the quality of service information corresponding to the second communications link from the fourth wireless terminal.

4. The method of claim 3,
wherein yielding comprises deciding to not transmit a transmission request response to the fourth wireless terminal.

5. The method of claim 4, further comprising:
deciding to transmit said transmission request response to the fourth wireless terminal when the estimated quality of the second communications link exceeds the dynamically generated threshold.

6. The method of claim 4, wherein the estimated quality of the second communications link is based on a current communications rate supported by the second communications link.

7. The method of claim 4, wherein the estimated quality of the second communications link is based on a current signal to noise ratio of the second communications link.

8. The method of claim 4, wherein said quality of service information is based on the amount of data waiting to be transmitted by the fourth wireless terminal to the first wireless terminal.

9. The method of claim 4, wherein the quality of service information indicates a quality of service level corresponding to a type of traffic waiting at said fourth wireless terminal to be transmitted.

10. The method of claim 4, wherein dynamically generating said threshold includes generating a lower threshold than a previous threshold when the quality of service information indicates an increase in a quality of service level corresponding to the second communications link.

11. The method of claim 4, wherein dynamically generating said threshold includes generating a higher threshold than a previous threshold when the quality of service information indicates a decrease in a quality of service level corresponding to the second communications link.

12. The method of claim 4, wherein the historic link quality information includes an average data rate supported by the second communications link during a previous time interval.

13. A first wireless terminal in a system including a first wireless communications link from a second wireless terminal to a third wireless terminal, said first communications link having a higher priority than a second communications link from a fourth wireless terminal to said first wireless terminal, the first wireless terminal comprising:
at least one processor configured to:
receive a signal from the second wireless terminal;
receive a transmission request from the fourth wireless terminal, the transmission request indicating an intent of the fourth wireless terminal to transmit data to the first wireless terminal;
estimate the quality of the second communications link from the signal received from the second wireless terminal and the transmission request received from the fourth wireless terminal;
dynamically generate a yielding threshold based on at least one of: i) historic link quality information corresponding to the second communications link; or ii) quality of service information corresponding to the second communications link; and
yield when the estimated quality of the second communications link does not exceed the dynamically generated yielding threshold, wherein the yielding comprises a decision to not have the fourth wireless terminal transmit the data to the first wireless terminal; and
a memory coupled to said at least one processor.

14. The first wireless terminal of claim 13, wherein the received signal from the second wireless terminal is a transmission request signal sent from the second wireless terminal to the third wireless terminal.

15. The first wireless terminal of claim 13, where said at least one processor is further configured to:
receive the quality of service information corresponding to the second communications link from the fourth wireless terminal.

16. The first wireless terminal of claim 15, wherein yielding comprises deciding to not transmit a transmission request response to the fourth wireless terminal.

17. The first wireless terminal of claim 16, wherein said at least one processor is configured to:
decide to transmit said transmission request response to the fourth wireless terminal when the estimated quality of the second communications link exceeds the dynamically generated threshold.

18. The first wireless terminal of claim 16, wherein the estimated quality of the second communications link is based on a current communications rate supported by the second communications link.

19. The first wireless terminal of claim 16, wherein the estimated quality of the second communications link is based on a current signal to noise ratio of the second communications link.

20. The first wireless terminal of claim 16, wherein said quality of service information is based on the amount of data waiting to be transmitted by the fourth wireless terminal to the first wireless terminal.

21. The first wireless terminal of claim 16, wherein the quality of service information indicates a quality of service level corresponding to a type of traffic waiting at said fourth wireless terminal to be transmitted.

22. The first wireless terminal of claim 16, wherein said at least one processor is configured to generate a lower threshold than a previous threshold when the quality of service information indicates an increase in a quality of service level corresponding to the second communications link, as part of being configured to dynamically generate said threshold.

23. The first wireless terminal of claim 16, wherein said at least one processor is configured to generate a higher threshold than a previous threshold when the quality of service information indicates a decrease in a quality of service level corresponding to the second communications link, as part of being configured to dynamically generate said threshold.

24. The first wireless terminal of claim 16, wherein the historic link quality information includes an average data rate supported by the second communications link during a previous time interval.

25. A first wireless terminal in a system including a first wireless communications link from a second wireless terminal to a third wireless terminal, said first communications link having a higher priority than a second communications link from a fourth wireless terminal to said first wireless terminal, the first wireless terminal comprising:
means for receiving a signal from the second wireless terminal;
means for receiving a transmission request from the fourth wireless terminal, the transmission request indicating an intent of the fourth wireless terminal to transmit data to the first wireless terminal;
means for estimating the quality of the second communications link from the signal received from the second wireless terminal and the transmission request received from the fourth wireless terminal;
means for dynamically generating a yielding threshold based on at least one of: i) historic link quality information corresponding to the second communications link; or ii) quality of service information corresponding to the second communications link; and
means for yielding when the estimated quality of the second communications link does not exceed the dynamically generated yielding threshold, wherein the yielding comprises a decision to not have the fourth wireless terminal transmit the data to the first wireless terminal.

26. The first wireless terminal of claim 25, wherein the received signal from the second wireless terminal is a transmission request signal sent from the second wireless terminal to the third wireless terminal.

27. The first wireless terminal of claim 25, further comprising:
means for receiving the quality of service information corresponding to the second communications link from the fourth wireless terminal.

28. The first wireless terminal of claim 27, wherein yielding comprises deciding to not transmit a transmission request response to the fourth wireless terminal.

29. The first wireless terminal of claim 28, further comprising:
means for deciding to transmit said transmission request response to the fourth wireless terminal when the estimated quality of the second communications link exceeds the dynamically generated threshold.

30. The first wireless terminal of claim 28, wherein the estimated quality of the second communications link is based on a current communications rate supported by the second communications link.

31. The first wireless terminal of claim 28, wherein the estimated quality of the second communications link is based on a current signal to noise ratio of the second communications link.

32. The first wireless terminal of claim 28, wherein said quality of service information is based on the amount of data waiting to be transmitted by the fourth wireless terminal to the first wireless terminal.

33. The first wireless terminal of claim 28, wherein the quality of service information indicates a quality of service level corresponding to a type of traffic waiting at said fourth wireless terminal to be transmitted.

34. The first wireless terminal of claim 28, wherein said means for dynamically generating said threshold includes means for generating a lower threshold than a previous threshold when the quality of service information indicates an increase in a quality of service level corresponding to the second communications link.

35. The first wireless terminal of claim 28, wherein said means for dynamically generating said threshold includes means for generating a higher threshold than a previous threshold when the quality of service information indicates a decrease in a quality of service level corresponding to the second communications link.

36. The first wireless terminal of claim 28, wherein the historic link quality information includes an average data rate supported by the second communications link during a previous time interval.

37. A computer program product for use in a first wireless terminal in a system including a first wireless communications link from a second wireless terminal to a third wireless terminal, said first communications link having a higher priority than a second communications link from a fourth wireless terminal to said first wireless terminal, the computer program product comprising:
a non-transitory computer readable medium comprising:
code for causing at least one computer to receive a signal from the second wireless terminal;
code for causing the at least one computer to receive a transmission request from the fourth wireless terminal, the transmission request indicating an intent of the fourth wireless terminal to transmit data to the first wireless terminal;
code for causing the at least one computer to estimate the quality of the second communications link from the signal received from the second wireless terminal and the transmission request received from the fourth wireless terminal;
code for causing the at least one computer to dynamically generate a yielding threshold based on at least one of: i) historic link quality information corresponding to the second communications link; or ii) quality of service information corresponding to the second communications link; and code for causing the at least one computer to yield when the estimated quality of the second communications link does not exceed the dynamically generated yielding threshold, wherein the yielding comprises a decision to not have the fourth wireless terminal transmit the data to the first wireless terminal.

* * * * *